United States Patent
Gong et al.

(10) Patent No.: US 11,956,178 B2
(45) Date of Patent: Apr. 9, 2024

(54) SIGNAL SENDING METHOD, SIGNAL RECEIVING METHOD, AND DEVICE

(71) Applicant: HUAWEI TECHNOLOGIES CO., LTD., Shenzhen (CN)

(72) Inventors: Mingxin Gong, Beijing (CN); Bingyu Qu, Beijing (CN); Yongxing Zhou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 415 days.

(21) Appl. No.: 17/380,097

(22) Filed: Jul. 20, 2021

(65) Prior Publication Data

US 2021/0351897 A1 Nov. 11, 2021
US 2022/0182209 A9 Jun. 9, 2022

Related U.S. Application Data

(63) Continuation of application No. PCT/CN2020/071542, filed on Jan. 10, 2020.

(30) Foreign Application Priority Data

Jan. 21, 2019 (CN) .......................... 201910054913.4

(51) Int. Cl.
*H04L 5/00* (2006.01)
*H04J 13/00* (2011.01)
(Continued)

(52) U.S. Cl.
CPC ........ *H04L 5/0094* (2013.01); *H04J 13/0062* (2013.01); *H04L 25/0226* (2013.01); *H04L 27/26025* (2021.01)

(58) Field of Classification Search
CPC ............... H04J 13/0062; H04L 5/0094; H04L 25/0226; H04L 27/26025
See application file for complete search history.

(56) References Cited

U.S. PATENT DOCUMENTS 10,298,364 B2 * 5/2019 Werner ................ H04L 5/0007
10,312,990 B2 * 6/2019 Qu ...................... H04L 27/3411
(Continued)

FOREIGN PATENT DOCUMENTS

CN 101076182 A 11/2007
CN 101447970 A 6/2009
(Continued)

OTHER PUBLICATIONS

Office Action issued in CN201910054913.4, dated May 11, 2022, 6 pages.
(Continued)

*Primary Examiner* — Alpus Hsu

(57) ABSTRACT

A signal sending method, a signal receiving method, and a device for signal transmission or receiving are provided. A part that is of a first signal and that is carried on a $k^{th}$ subcarrier in an $i^{th}$ subcarrier group in N subcarrier groups is $x_{i,n_{id}}(k)$, and a sequence $\{s_{i,n_{id}}(k)\}$ related to $x_{i,n_{id}}(k)$ is one of enumerated sequences. The enumerated sequences are sequences with relatively good cross-correlation. Therefore, for two subcarrier groups, provided that selected $\{s_{i,n_{id}}(k)\}$ is two of the enumerated sequences, cross-correlation between signals carried in the two subcarrier groups can be ensured to be relatively good, thereby reducing interference between the signals and improving channel estimation performance.

20 Claims, 9 Drawing Sheets

(51) Int. Cl.
*H04L 25/02* (2006.01)
*H04L 27/26* (2006.01)

(56) References Cited

U.S. PATENT DOCUMENTS

| | | | | |
|---|---|---|---|---|
| 10,547,427 | B2* | 1/2020 | Hwang | H04L 5/0051 |
| 10,736,105 | B2* | 8/2020 | Qu | H04W 72/0453 |
| 10,819,550 | B2* | 10/2020 | Lyu | H04L 27/2657 |
| 10,911,285 | B2* | 2/2021 | Liu | H04L 5/0044 |
| 11,258,644 | B2* | 2/2022 | Iwai | H04L 27/261 |
| 11,405,899 | B2* | 8/2022 | Liu | H04W 72/21 |
| 2012/0269138 | A1 | 10/2012 | Han et al. | |

FOREIGN PATENT DOCUMENTS

| | | |
|---|---|---|
| CN | 105144598 A | 12/2015 |
| CN | 108111270 A | 6/2018 |
| CN | 108282439 A | 7/2018 |
| CN | 108632002 A | 10/2018 |
| CN | 108809562 A | 11/2018 |
| CN | 109076048 A | 12/2018 |
| CN | 109245871 A | 1/2019 |
| EP | 1164740 A2 | 12/2001 |
| EP | 2615786 A2 | 7/2013 |
| EP | 3439218 A1 | 2/2019 |
| WO | 2017171314 A1 | 10/2017 |
| WO | 2018024127 A1 | 2/2018 |

OTHER PUBLICATIONS

Extended European Search Report issued in EP20744444.9, dated Jan. 27, 2022, 11 pages.
Huawei, HiSilicon, Uplink DMRS enhancement to support more orthogonal partial overlapped ports. 3GPP TSG RAN WG1 Meeting #86, Göteborg, Sweden, Aug. 22-26, 2016, R1-166141, 5 pages.
Qualcomm, Final Issues for Rel-15 PDSCH/PUSCH's DM-RS. 3GPP TSG RAN WG1 Meeting 91, Reno, USA, Nov. 27-Dec. 1, 2017, R1-1721686, 26 pages.
Huawei, HiSilicon, Sequence design for Pi/2-BPSK DFT-S-OFDM. 3GPP TSG RAN WG1 Meeting #95, Spokane, USA, Nov. 12-16, 2018, R1-1814086, 8 pages.
International Search Report and Written Opinion issued in PCT/CN2020/071542, dated Apr. 9, 2020, 10 pages.
Office Action issued in CN201910054913.4, dated Oct. 24, 2022, 6 pages.

* cited by examiner

SIGNAL SENDING METHOD, SIGNAL RECEIVING METHOD, AND DEVICE

CROSS-REFERENCE TO RELATED APPLICATIONS

This application is a continuation of International Application No. PCT/CN2020/071542, filed on Jan. 10, 2020. Which claims priority to Chinese Patent Application No. 201910054913.4, filed on Jan. 21, 2019. The disclosures of the aforementioned applications are hereby incorporated by reference in their entireties.

TECHNICAL FIELD

This application relates to the field of communication technologies, and in particular, to a signal sending method, a signal receiving method, and a device.

BACKGROUND

In a new radio (NR) system, a sequence obtained based on a Gold sequence is used for a downlink demodulation reference signal (DMRS), and the sequence is mapped to a frequency domain subcarrier through quadrature phase shift keying (QPSK) modulation. For example, for a DMRS on a physical downlink control channel (PDCCH), a sequence $\{c(n)\}$ used for the DMRS is obtained by intercepting a Gold sequence whose length is $(2^{31}-1)$, where an initialization value of the Gold sequence is determined based on factors such as DMRS scrambling identifier (ID) of a terminal device, a subframe number of a subframe in which the DMRS is located, and a position of an OFDM symbol. The sequence $\{c(n)\}$ is modulated into $\{s(n)\}$ through QPSK, where $s(n)=(1-2c(2n))/\sqrt{2}+j(1-2c(2n+1))/\sqrt{2}$, and then the sequence $\{s(n)\}$ is carried on a subcarrier of the DMRS.

Although a complete Gold sequence has a characteristic of good cross-correlation, in the NR system, only segments of the Gold sequence are used for the downlink DMRS, and cross-correlation between the segments of the Gold sequence is relatively poor. Consequently, interference between signals is relatively strong, and channel estimation performance is affected.

SUMMARY

Embodiments of this application provide a signal sending method, a signal receiving method, and a device, to reduce interference between signals.

According to an embodiment of a first aspect, a signal sending method is provided, and the method includes:
determining a time-frequency resource, where the time-frequency resource includes N subcarrier groups, the $i^{th}$ subcarrier group in the N subcarrier groups includes $K_i$ subcarriers, N is a positive integer greater than or equal to 1, and $K_i$ is an integer greater than 1; and
sending a first signal on the N subcarrier groups, where a part that is of the first signal and that is carried on the $k^{th}$ subcarrier in the $i^{th}$ subcarrier group in the N subcarrier groups is $x_{i,n_{id}}(k)$, where $k=0, 1, 2, \ldots, K_i-1$, $x_{i,n_{id}}(k)=A \cdot c_i(k) \cdot b_{i,n_{id}}$, $c_i(k)=\mu \cdot \exp(\pi \cdot j \cdot s_{i,n_{id}}(k)/4) \cdot \exp(\alpha_{i,n_{id}} 2\pi k j/K_i) d_i(k)$, A and $\mu$ are both non-zero complex constants, $b_{i,n_{id}}$ is a non-zero complex constant, $j=\sqrt{-1}$, $n_{id}$ is an identifier of the first signal or a cell identifier, $\alpha_{i,n_{id}}$ is a real number, and the sequence $\{s_{i,n_{id}}(k)\}$ is one of the following sequences:

{1, −3, −1, 3, −1, 3, −3, −3, 3, −3, −3, −1, 3, 1, −1, 1, −3},
{1, 1, −1, −1, 3, −1, 1, −3, 1, −1, −3, 1, 3, −1, 1, −1, 1, 1},
{1, −3, 3, 3, 3, −1, 1, −3, 1, 3, 1, 1, −1, 3, 1, 3, 1, −3},
{1, 1, 3, −1, −1, 3, −3, −3, −3, −1, 1, −3, 3, −1, 1, 3, 1, 1},
{1, −3, 3, −1, −1, −1, −3, 1, 1, −1, 1, −3, −1, 3, −3, −1, 1, −3},
{1, 1, 3, 3, 3, 3, 1, 1, −3, 3, 1, 1, 3, −1, −3, −1, 1, 1},
{1, −3, −1, −1, 3, 3, 1, 1, −3, −1, −3, 1, −1, 3, −3, 3, 1, −3},
{1, 1, −1, 3, −1, −1, −3, 1, 1, 3, −3, −3, 3, −1, −3, 3, 1, 1},
{1, 1, 1, −3, −1, −3, 1, −1, 3, −3, −1, −3, 3, −1, −1, −1, 1},
{1, −3, 1, 1, 3, 1, −3, −1, −1, 1, −1, 1, −1, 3, −1, −1, 1, −3},
{1, −3, −3, 1, −1, −3, 1, −1, 3, 1, 3, −3, −1, 3, −1, 3, 1, −3},
{1, 1, −3, −3, 3, 1, −3, −1, −1, −3, 3, 1, 3, −1, −1, 3, 1, 1},
{1, 1, −3, 1, −1, 1, 1, 3, −1, 1, 3, −3, 3, −1, 3, −1, 1, 1},
{1, −3, −3, −3, 3, −3, −3, 3, 3, −3, 3, 1, −1, 3, 3, −1, 1, −3},
{1, −3, 1, −3, −1, 1, 1, 3, −1, −3, −1, −3, −1, 3, 3, 3, 1, −3},
{1, 1, 1, 1, 3, −3, −3, 3, 3, 1, −1, 1, 3, −1, 3, 3, 1, 1},
{1, 1, −1, 3, 3, 3, −3, −3, 1, −1, −3, −3, 3, 3, 1, 3, 1, 1},
{1, −3, −1, −1, −1, −1, 1, −3, −3, 3, −3, 1, −1, −1, 1, 3, 1, −3},
{1, −3, 3, −1, 3, 3, −3, −3, 1, 3, 1, −3, −1, −1, 1, −1, 1, −3},
{1, 1, 3, 3, −1, −1, 1, −3, −3, −1, 1, 1, 3, 3, 1, −1, 1, 1},
{1, 1, 3, −1, 3, −1, −3, 1, −3, 3, 3, −3, 3, 1, 1},
{1, −3, 3, 3, −1, 3, 1, 1, 1, −1, 1, 1, −1, −1, −3, 3, 1, −3},
{1, 1, −1, −1, −1, 3, 1, 1, 1, 3, −3, 1, 3, 3, −3, −1, 1, 1},
{1, −3, −1, 3, 3, −1, −3, 1, −3, −1, −3, −3, −1, −1, −3, −1, 1, −3},
{1, 1, 1, 1, −1, 1, −3, −1, 3, −3, −1, 1, 3, 3, −1, 3, 1, 1},
{1, −3, 1, −3, 3, −3, 1, −1, −1, 1, −1, −3, −1, −1, −1, 3, 1, −3},
{1, 1, −3, 1, 3, −3, 1, −1, −1, −3, 3, −3, 3, 3, −1, −1, 1, 1},
{1, −3, −3, −3, −1, 1, −3, −1, 3, 1, 3, 1, −1, −1, −1, −1, 1, −3},
{1, 1, −3, −3, −1, −3, −3, 3, −1, 1, 3, 1, 3, 3, 3, 1, 1}, or
{1, −3, −3, 1, 3, 1, 1, 3, 3, −3, 3, −3, −1, −1, 3, 3, 1, −3},
where
the sequence $\{x_{i,n_{id}}(k)\}$ is determined from a first sequence group based on the identifier of the first signal or the cell identifier; or the sequence $\{s_{i,n_{id}}(k)\}$ is determined from a second sequence group based on the identifier of the first signal or the cell identifier.

The method may be performed by a first communication apparatus. The first communication apparatus may be a first device or a communication apparatus that can support the first device in implementing a function required in the method. The first communication apparatus may alternatively be another communication apparatus, for example, a chip system. Herein, an example in which the first communication apparatus is the first device is used. The first device may be a terminal device, or may be a network device. For example, the network device is an access network device, for example, a base station.

In this embodiment, the part that is of the first signal and that is carried on the $k^{th}$ subcarrier in the $i^{th}$ subcarrier group in the N subcarrier groups is $x_{i,n_{id}}(k)$, and the sequence $\{s_{i,n_{id}}(k)\}$ related to $x_{i,n_{id}}(k)$ is one of the enumerated sequences. The enumerated sequences are sequences with relatively good cross-correlation. Therefore, when terminal devices in different cells in a system send signals on a same time-frequency resource according to the foregoing rule, for a same time domain resource used by different terminal devices and a same subcarrier group, provided that $\{s_{i,n_{id}}(k)\}$ selected by the different terminal devices are different sequences in the enumerated sequences, it can be ensured that when the terminal devices in the different cells send signals in a same subcarrier group, cross-correlation between the signals carried in the subcarrier group is relatively good, thereby reducing interference between the signals in the cells and improving channel estimation performance of access network devices in the different cells. The first signal in this embodiments may alternatively be a downlink signal. When access network devices in different cells in a system send signals on a same time-frequency resource according to the foregoing rule, provided that $\{s_{i,n_{id}}(k)\}$ selected by the access network devices in the different cells are different sequences in the enumerated sequences, it can be ensured that when signals are sent in a same subcarrier group, cross-correlation between the signals carried in the subcarrier group is relatively good, thereby reducing interference between the signals in the cells and improving channel estimation performance of terminal devices in the different cells.

With reference to the first aspect, in an exemplary implementation of the first aspect, the method further includes: sending first signaling, where the first signaling is used to indicate the identifier of the first signal.

The first device may send the identifier of the first signal, and a second device may obtain the identifier of the first signal after receiving the first signaling, to determine the sequence $\{s_{i,n_{id}}(k)\}$ or the like based on the identifier of the first signal.

According to an embodiment of a second aspect, a signal receiving method is provided, and the method includes:

receiving a first signal carried on N subcarriers, and obtaining $K_i$ elements in a sequence $\{x_{i,n_{id}}(k)\}$ carried in the $i^{th}$ subcarrier group in the N subcarrier groups, where k=0, 1, 2, . . . , $K_i$-1, $x_{i,n_{id}}(k)=A \cdot c_i(k) \cdot b_{i,n_{id}}$, $c_i(k)=\mu \cdot exp(\pi \cdot j \cdot s_{i,n_{id}}(k)/4) \cdot exp(\alpha_{i,n_{id}} 2\pi kj/K_i)d_i(k)$, A and $\mu$ are both non-zero complex constants, $b_{i,n_{id}}$ is a non-zero complex constant of k, $j=\sqrt{-1}$, $n_{id}$ is an identifier of the first signal or a cell identifier, and $\alpha_{i,n_{id}}$ is a real number; and processing, based on the $K_i$ elements in the sequence $\{x_{i,n_{id}}(k)\}$, a signal carried in the $i^{th}$ subcarrier group in the N subcarrier groups, where the sequence $\{s_{i,n_{id}}(k)\}$ is one of the following sequences:

{1, −3, −1, 3, −1, 3, −3, −3, −3, 3, −3, −3, −1, 3, 1, −1, 1, −3},
{1, 1, −1, −1, 3, −1, 1, −3, 1, −1, −3, 1, 3, −1, 1, −1, 1, 1},
{1, −3, 3, 3, 3, −1, 1, −3, 1, 3, 1, 1, −1, 3, 1, 3, 1, −3},
{1, 1, 3, −1, −1, 3, −3, −3, −3, −1, 1, −3, 3, −1, 1, 3, 1, 1},
{1, −3, 3, −1, −1, −1, −3, 1, 1, −1, 1, −3, −1, 3, −3, −1, 1, −3},
{1, 1, 3, 3, 3, 3, 1, 1, −3, 3, 1, 1, 3, −1, −3, −1, 1, 1},
{1, −3, −1, −1, 3, 3, 1, 1, −3, −1, −3, 1, −1, 3, −3, 3, 1, −3},
{1, 1, −1, 3, −1, −1, −3, 1, 1, 3, −3, −3, 3, −1, −3, 3, 1, 1},
{1, 1, 1, −3, −1, −3, 1, −1, 3, −3, −1, −3, 3, −1, −1, −1, 1, 1},
{1, −3, 1, 1, 3, 1, −3, −1, −1, 1, −1, 1, −1, 3, −1, −1, 1, −3},
{1, −3, −3, 1, −1, −3, 1, −1, 3, 1, 3, −3, −1, 3, −1, 3, 1, −3},
{1, 1, −3, −3, 3, 1, −3, −1, −1, −3, 3, 1, 3, −1, −1, 3, 1, 1},
{1, 1, −3, 1, −1, 1, 1, 3, −1, 1, 3, −3, 3, −1, 3, −1, 1, 1},
{1, −3, −3, −3, 3, −3, −3, 3, 3, −3, 3, 1, −1, 3, 3, −1, 1, −3},
{1, −3, 1, −3, −1, 1, 1, 3, −1, −3, −1, −3, −1, 3, 3, 3, 1, −3},
{1, 1, 1, 1, 3, −3, −3, 3, 3, 1, −1, 1, 3, −1, 3, 3, 1, 1},
{1, 1, −1, 3, 3, 3, −3, −3, 1, −1, −3, −3, 3, 1, 3, 1, 1},
{1, −3, −1, −1, −1, −1, 1, −3, −3, 3, 1, −1, −1, 1, 3, 1, −3},
{1, −3, 3, −1, 3, 3, −3, −3, 1, 3, 1, −3, −1, −1, 1, −1, 1, −3},
{1, 1, 3, 3, −1, −1, 1, −3, −3, −1, 1, 1, 3, 3, 1, −1, 1, 1},
{1, 1, 3, −1, 3, −1, −3, 1, −3, 3, 1, −3, 3, 3, −3, 3, 1, 1},
{1, −3, 3, 3, −1, 3, 1, 1, 1, −1, 1, 1, −1, −1, −3, 3, 1, −3},
{1, 1, −1, −1, −1, 3, 1, 1, 1, 3, −3, 1, 3, 3, −3, −1, 1, 1},
{1, −3, −1, 3, 3, −1, −3, 1, −3, −1, −3, −3, −1, −1, −3, −1, 1, −3},
{1, 1, 1, −1, 1, −3, −1, 3, −3, −1, 1, 3, 3, −1, 3, 1, 1},
{1, −3, 1, −3, 3, −3, 1, −1, −1, 1, −1, −3, −1, −1, −1, 3, 1, −3},
{1, 1, −3, 1, 3, −3, 1, −1, −1, −3, 3, −3, 3, 3, −1, −1, 1, 1},
{1, −3, −3, −3, −1, 1, −3, −1, 3, 1, 3, 1, −1, −1, −1, −1, 1, −3},
{1, 1, −3, −3, −1, −3, −3, −1, 1, 3, 1, 3, 3, 3, 3, 1, 1}, or
{1, −3, −3, 1, 3, 1, 1, 3, 3, −3, 3, −3, −1, −1, 3, 3, 1, −3}, where the sequence $\{x_{i,n_{id}}(k)\}$ is determined from a first sequence group based on the identifier of the first signal or the cell identifier; or the sequence $\{s_{i,n_{id}}(k)\}$ is determined from a second sequence group based on the identifier of the first signal or the cell identifier.

The method may be performed by a second communication apparatus. The second communication apparatus may be a second device or a communication apparatus that can support the second device in implementing a function required in the method. The second communication apparatus may alternatively be another communication apparatus, for example, a chip system. Herein, an example in which the second communication apparatus is the second device is used. A first device is a terminal device, and the second device is a network device; or a first device is a network device, and the second device is a terminal device. For example, the network device is an access network device, for example, a base station.

With reference to the second aspect, in an exemplary implementation of the second aspect, the method further includes: receiving first signaling, where the first signaling is used to indicate the identifier of the first signal.

For a technical effect of the second aspect or an exemplary implementation of the second aspect, refer to the descriptions of the technical effect of the first aspect or the possible implementation of the first aspect.

With reference to the first aspect, in an exemplary implementation of the first aspect, or with reference to the second aspect, in an exemplary implementation of the second aspect, $b_{i,n_{id}}$ is the non-zero complex constant independent of k.

$b_{i,n_{id}}$ is irrelevant to k, that is, does not change depend on a change of k. For example, when k is different, a same value of $b_{i,n_{id}}$ may be used. Optionally, $b_{i,n_{id}}$ may be related to the identifier of the first signal or the cell identifier. For example, $b_{i,n_{id}}$ may be different when identifiers of the first signal are different, or $b_{i,n_{id}}$ may be different when cell identifiers are different. $b_{i,n_{id}}$ may be related to a subcarrier group. For example, different subcarrier groups may use a same $b_{i,n_{id}}$ or may use different $b_{i,n_{id}}$. Optionally, $b_{i,n_{id}}$ may be determined based on i and $n_{id}$.

With reference to the first aspect, in an exemplary implementation of the first aspect, or with reference to the second aspect, in an exemplary implementation of the second aspect, $d_i(k)$ is irrelevant to the identifier of the first signal or the cell identifier.

The sequence $\{d_i(k)\}$ is irrelevant to the identifier of the first signal. For example, when the identifiers of the first signal are different, the sequence $\{d_i(k)\}$ may be the same. Alternatively, it may be understood that one sequence $\{d_i(k)\}$ may correspond to at least two identifiers of the first signal. Alternatively, the sequence $\{d_i(k)\}$ is also irrelevant to the cell identifier. For example, when the cell identifiers are different, the sequence {d_i(k)} may be the same. Alternatively, it may be understood that one sequence {d_i(k)} may correspond to at least two cell identifiers.

With reference to the first aspect, in an exemplary implementation of the first aspect, or with reference to the second aspect, in an exemplary implementation of the second aspect, each of the N subcarrier groups carries a part of the first signal, and parts of the first signal carried in at least two of the N subcarrier groups are different.

For example, the first device sends the first signal by using the N subcarrier groups, where the N subcarrier groups separately carry different parts of the first signal. In this way, the complete first signal can be sent by using the N subcarrier groups, and the second device is prevented from repeatedly receiving a same part of the first signal.

With reference to the first aspect, in an exemplary implementation of the first aspect, or with reference to the second aspect, in an exemplary implementation of the second aspect, every two of the N subcarrier groups are frequency-division-orthogonal, and the N subcarrier groups occupy a same time domain resource.

In this embodiment, the N subcarrier groups may be frequency-division-orthogonal, and the N subcarrier groups may occupy the same time domain resource, so that all parts of the first signal may be sent at a same moment by using the N subcarriers, thereby improving efficiency of sending the first signal.

With reference to the first aspect, in an exemplary implementation of the first aspect, or with reference to the second aspect, in an exemplary implementation of the second aspect, $\alpha_{i,n_{id}} \in \{0, 1, 2, \ldots, K_i-1\}$.

$\alpha_{i,n_{id}}$ may represent a cyclic shift in time domain, and in an example, $\alpha_{i,n_{id}} \in \{0, 1, 2, \ldots, K_i-1\}$. In addition, it should be noted that when $\alpha_{i,n_{id}}=0$, it indicates that the sequence does not need to perform a cyclic shift in time domain.

With reference to the first aspect, in an exemplary implementation of the first aspect, or with reference to the second aspect, in an exemplary implementation of the second aspect, the $K_i$ subcarriers are evenly spaced.

For example, if a spacing between every two adjacent subcarriers in the $K_i$ subcarriers is 0, it indicates that the $K_i$ subcarriers are consecutive subcarriers. The first signal is sent by using the evenly spaced subcarriers, so that the second device can detect the first signal in a convenient way. This is merely an example, or the $K_i$ subcarriers may not be evenly spaced. This is not specifically limited.

With reference to the first aspect, in an exemplary implementation of the first aspect, or with reference to the second aspect, in an exemplary implementation of the second aspect, the first signal is a DMRS, an SRS, or control information.

This is merely an example herein. A specific type of the first signal is not limited in embodiments of this application.

According to an embodiment of a third aspect, a second signal sending method is provided, and the method includes:
determining a time-frequency resource, where the time-frequency resource includes N subcarrier groups, the $i^{th}$ subcarrier group in the N subcarrier groups includes $K_i$ subcarriers, the $K_i$ subcarriers are evenly spaced, N is a positive integer greater than or equal to 1, and $K_i$ is an integer greater than 1; and
sending a first signal on the N subcarrier groups, where a part that is of the first signal and that is carried in the $i^{th}$ subcarrier group in the N subcarrier groups is a first segment of a sequence $\{z_q(m)\}$; a length of the sequence $\{z_q(m)\}$ is M; the sequence meets $z_q(m)=y_q(m \bmod M_{zc})$, where $m=0, 1, 2, \ldots, M-1$, M is an integer greater than 1, $M_{zc}$ is a maximum prime number that meets $M_{zc}<M$, or $M_{zc}$ is a minimum prime number that meets $M_{zc}>M$; and $$K_i < \frac{M_{ZC}}{2}, \; y_q(t) = A \cdot \exp(j\alpha t)\exp\left(-\frac{j\pi qt(t+1)}{M_{zc}}\right),$$

where A is a non-zero complex constant, $t=0, 1, 2, \ldots, M_{zc}-1$, $j=\sqrt{-1}$, $\alpha$ is a real number, q is determined based on an identifier of the first signal or a cell identifier, and $q=\lfloor \bar{q}+\frac{1}{2} \rfloor$, where $\bar{q}=M_{zc}\cdot(n_{id}+1)/p$, $n_{id} \in \{0, 1, 2, \ldots, p-2\}$, p is a prime number greater than 2, and $n_{id}$ is determined based on the identifier of the first signal or the cell identifier.

The method may be performed by a third communication apparatus. The third communication apparatus may be a first device or a communication apparatus that can support the first device in implementing a function required in the method. The third communication apparatus may alternatively be another communication apparatus, for example, a chip system. Herein, an example in which the third communication apparatus is the first device is used. The first device may be a terminal device, or may be a network device. For example, the network device is an access network device, for example, a base station.

In this embodiment, the part that is of the first signal and that is carried on the $k^{th}$ subcarrier in the $i^{th}$ subcarrier group in the N subcarrier groups is the segment of $\{z_q(m)\}$. When q meets the condition in this embodiment, when terminal devices in different cells in a system send signals on a same time-frequency resource according to the foregoing rule, for a same time domain resource used by different terminal devices and a same subcarrier group, provided that sequences of the different terminal devices are obtained based on a ZC sequence with different values of q, it can be ensured that when the terminal devices in the different cells send signals in a same subcarrier group, cross-correlation between the signals carried in the subcarrier group is relatively good, thereby reducing interference between the signals in the cells and improving channel estimation performance of access network devices in the different cells. The first signal in this embodiment may alternatively be a downlink signal. According to the downlink signal sent by using the method in the foregoing embodiment, the cross-correlation between the signals carried in the same subcarrier group can also be relatively good, thereby reducing the interference between the signals in the cells and improving the channel estimation performance of the terminal devices in the different cells.

With reference to the third aspect, in an exemplary implementation of the third aspect, the method further includes: determining the first segment in the sequence based on a frequency domain position of the $i^{th}$ subcarrier group.

In other words, a specific segment of the sequence carried in each of the N subcarrier groups may be related to a frequency domain position of each subcarrier group, so that it can be ensured that the N subcarrier groups can carry a relatively complete sequence.

According to a fourth aspect, a second signal receiving method is provided, and the method includes: receiving a first signal carried on N subcarriers, and obtaining a sequence that is carried by the first signal and that is in the $i^{th}$ subcarrier group in the N subcarrier groups, where the sequence is a first segment of a sequence $\{z_q(m)\}$; a length of the sequence $\{z_q(m)\}$ is M; the sequence meets $z_q(m)=y_q(m \bmod M_{zc})$, where m=0, 1, 2, ..., M−1, M is an integer greater than 1, $M_{zc}$ is a maximum prime number that meets $M_{zc}<M$, or $M_{zc}$ is a minimum prime number that meets $M_{zc}>M$; and $$K_i < \frac{Mzc}{2}, \quad y_q(t) = A \cdot \exp(j\alpha t)\exp\left(-\frac{j\pi qt(t+1)}{M_{zc}}\right),$$

where A is a non-zero complex constant, t=0, 1, 2, ..., $M_{zc}$−1, $j=\sqrt{-1}$, α is a real number, q is determined based on an identifier of the first signal or a cell identifier, and $q=\lfloor \bar{q}+\frac{1}{2} \rfloor$, where $\bar{q}=M_{zc}\cdot(n_{id}+1)/p$, $n_{id} \in \{0, 1, 2, \ldots, p-2\}$, p is a prime number greater than 2, and $n_{id}$ is determined based on the identifier of the first signal or the cell identifier.

The method may be performed by a fourth communication apparatus. The fourth communication apparatus may be a second device or a communication apparatus that can support the second device in implementing a function required in the method. The fourth communication apparatus may alternatively be another communication apparatus, for example, a chip system. Herein, an example in which the fourth communication apparatus is the second device is used. A first device is a terminal device, and the second device is a network device; or a first device is a network device, and the second device is a terminal device. For example, the network device is an access network device, for example, a base station.

For a technical effect of the fourth aspect, refer to the descriptions of the technical effect of the second aspect.

With reference to the third aspect, in an exemplary implementation of the third aspect, or with reference to the fourth aspect, in an exemplary implementation of the fourth aspect, a part that is of the first signal and that is carried on the $k^{th}$ subcarrier in the $i^{th}$ subcarrier group in the N subcarrier groups is $x_{i,n_{id}}(k)$, where k=0, 1, 2, ..., $K_i$−1, $x_{i,n_{id}}(k)=z(d_i+k)$, and $d_i$ is a non-negative integer.

Herein, a method for determining the part that is of the first signal and that is carried on the $k^{th}$ subcarrier in the $i^{th}$ subcarrier group in the N subcarrier groups is provided.

With reference to the third aspect, in an exemplary implementation of the third aspect, or with reference to the fourth aspect, in an exemplary implementation of the fourth aspect, a value of M is determined based on a maximum system bandwidth or a bandwidth part, and a value of $d_i$ is determined based on a position, in the system bandwidth or the bandwidth part, of a subcarrier in the $i^{th}$ subcarrier group in which the first signal is located.

For example, the value of $d_i$ may be determined based on the position, in the system bandwidth or the BWP, of the subcarrier in the $i^{th}$ subcarrier group in which the first signal is located. In this embodiment, the value of M and/or the value of $d_i$ may be obtained according to the method provided above, or may be obtained in another manner. This is not specifically limited.

With reference to the third aspect, in an exemplary implementation of the third aspect, or with reference to the fourth aspect, in an exemplary implementation of the fourth aspect, the N subcarrier groups belong to a subcarrier group set, the subcarrier group set further includes F subcarrier groups, frequency domain positions of the F subcarrier groups are different from frequency domain positions of the N subcarrier groups, $n_{id}$ corresponding to the F subcarrier groups is the same as $n_{id}$ corresponding to the N subcarrier groups, and F is a positive integer.

For example, $n_{id}$ may be irrelevant to the frequency domain positions occupied by the N subcarriers. For example, the N subcarrier groups may belong to the subcarrier group set, the subcarrier group set further includes the F subcarrier groups, and the frequency domain positions of the F subcarrier groups are different from the frequency domain positions of the N subcarrier groups. If the first device also sends a signal by using the F subcarrier groups in a manner same as that in this embodiment, the F subcarrier groups also correspond to $n_{id}$. In this case, $n_{id}$ corresponding to the F subcarrier groups and $n_{id}$ corresponding to the N subcarrier groups may be the same or different. Specifically, whether $n_{id}$ corresponding to the F subcarrier groups and $n_{id}$ corresponding to the N subcarrier groups are the same or different is irrelevant to the frequency domain positions of the subcarrier groups. This enables the solutions in embodiments of this application more flexible.

With reference to the third aspect, in an exemplary implementation of the third aspect, or with reference to the fourth aspect, in an exemplary implementation of the fourth aspect, $d_i=$ $$\left\lfloor \frac{n_i}{n_{dist}} \right\rfloor + n_{offset}, \quad n_i$$

is a number of a smallest subcarrier in the $i^{th}$ subcarrier group, $n_{dist}$ is a spacing between subcarriers in the subcarrier group and is a positive integer, and $n_{offset}$ is an integer.

This is a manner for determining $d_i$. In embodiments of this application, the manner for determining $d_i$ is not limited thereto.

With reference to the third aspect, in an exemplary implementation of the third aspect, or with reference to the fourth aspect, in an exemplary implementation of the fourth aspect, each of the N subcarrier groups carries a part of the first signal, the part of the first signal carried in each subcarrier group is a segment of the sequence, and segments carried in at least two of the N subcarrier groups are different.

For example, the at least two subcarrier groups are the N subcarrier groups. In other words, signals carried in the N subcarrier groups are different. For example, the first device sends the first signal by using the N subcarrier groups, where the N subcarrier groups separately carry different parts of the first signal. In this way, the complete first signal can be sent by using the N subcarrier groups. Alternatively, the at least two subcarrier groups are only a proper subset of the N subcarrier groups. In this case, in addition to the at least two subcarrier groups, the N subcarrier groups further include other subcarrier groups. Signals carried in the other subcarrier groups may be the same. For example, the first device sends the first signal by using the N subcarrier groups, and the first signal includes a same part. Therefore, the at least two subcarrier groups may carry different parts of the first signal, the other subcarrier groups different from the at least two subcarrier groups in the N subcarrier groups may carry the same part of the first signal, so that the complete first signal can be sent by using the N subcarrier groups. Alternatively, the first device sends the first signal by using the N subcarrier groups. The first signal can be carried by using the at least two subcarrier groups, and an error-prone part or a relatively important part of the first signal can be carried by using other subcarrier groups different from the at least two subcarrier groups in the N subcarrier groups. In this case, the error-prone part or the relatively important part in the first signal may be transmitted for a plurality of times, thereby improving transmission reliability.

With reference to the third aspect, in an exemplary implementation of the third aspect, or with reference to the fourth aspect, in an exemplary implementation of the fourth aspect, $K_i$ is determined based on a BWP in which the N subcarrier groups are located.

A manner for determining $K_i$ is not limited in embodiments of this application.

With reference to the third aspect, in an exemplary implementation of the third aspect, or with reference to the fourth aspect, in an exemplary implementation of the fourth aspect, p=31.

For example, values of p corresponding to different subcarrier groups in the N subcarrier groups may be the same. For example, for the N subcarrier groups, values of p corresponding to at least two subcarrier groups may be the same. In an example, p may be equal to 31. In this case, a quantity of available sequences is 30, and a cell planning requirement can be met. This is not limited in embodiments of this application.

With reference to the third aspect, in an exemplary implementation of the third aspect, or with reference to the fourth aspect, in an exemplary implementation of the fourth aspect, a value of q is determined based on the cell identifier or a sequence group identifier.

In this embodiment, the value of q may be determined based on the cell identifier or the sequence group identifier, or q may be obtained in another manner. This is not specifically limited in embodiments of the present disclosure.

With reference to the third aspect, in an exemplary implementation of the third aspect, or with reference to the fourth aspect, in an exemplary implementation of the fourth aspect, the first signal is a DMRS, an SRS, or control information.

This is merely an example herein. A specific type of the first signal is not limited in embodiments of this application.

According to a fifth aspect, a first communication apparatus is provided. The communication apparatus may be a first device or may be a chip in the first device. The communication apparatus may include a processing module and a transceiver module. For example, the processing module may be a processor, and the transceiver module may be a transceiver. Optionally, the communication apparatus may further include a storage module, and the storage module may be a memory. The storage module is configured to store instructions, and the processing module executes the instructions stored in the storage module, so that the communication apparatus performs a corresponding function in the first aspect. When the communication apparatus is the chip in the first device, the processing module may be a processor, and the transceiver module may be an input/output interface, a pin, a circuit, or the like. The processing module executes the instructions stored in the storage module, so that the first device performs a corresponding function in the first aspect. The storage module may be a storage unit (for example, a register or a cache) in the chip, or may be a storage unit (for example, a read-only memory or a random access memory) that is in the first device and that is located outside the chip.

According to an embodiment of a sixth aspect, a second communication apparatus is provided. The communication apparatus may be a second device or may be a chip in the second device. The communication apparatus may include a processing module and a transceiver module. For example, the processing module may be a processor, and the transceiver module may be a transceiver. Optionally, the communication apparatus may further include a storage module, and the storage module may be a memory. The storage module is configured to store instructions, and the processing module executes the instructions stored in the storage module, so that the communication apparatus performs a corresponding function in the second aspect. When the communication apparatus is the chip in the second device, the processing module may be a processor, and the transceiver module may be an input/output interface, a pin, a circuit, or the like. The processing module executes the instructions stored in the storage module, so that the second device performs a corresponding function in the second aspect. The storage module may be a storage unit (for example, a register or a cache) in the chip, or may be a storage unit (for example, a read-only memory or a random access memory) that is in the second device and that is located outside the chip.

According to an embodiment of a seventh aspect, a third communication apparatus is provided. The communication apparatus may be a first device or may be a chip in the first device. The communication apparatus may include a processing module and a transceiver module. For example, the processing module may be a processor, and the transceiver module may be a transceiver. Optionally, the communication apparatus may further include a storage module, and the storage module may be a memory. The storage module is configured to store instructions, and the processing module executes the instructions stored in the storage module, so that the communication apparatus performs a corresponding function in the third aspect. When the communication apparatus is the chip in the first device, the processing module may be a processor, and the transceiver module may be an input/output interface, a pin, a circuit, or the like. The processing module executes the instructions stored in the storage module, so that the first device performs a corresponding function in the third aspect. The storage module may be a storage unit (for example, a register or a cache) in the chip, or may be a storage unit (for example, a read-only memory or a random access memory) that is in the first device and that is located outside the chip.

According to an embodiment of an eighth aspect, a fourth communication apparatus is provided. The communication apparatus may be a second device or may be a chip in the second device. The communication apparatus may include a processing module and a transceiver module. For example, the processing module may be a processor, and the transceiver module may be a transceiver. Optionally, the communication apparatus may further include a storage module, and the storage module may be a memory. The storage module is configured to store instructions, and the processing module executes the instructions stored in the storage module, so that the communication apparatus performs a corresponding function in the fourth aspect. When the communication apparatus is the chip in the second device, the processing module may be a processor, and the transceiver module may be an input/output interface, a pin, a circuit, or the like. The processing module executes the instructions stored in the storage module, so that the second device performs a corresponding function in the fourth aspect. The storage module may be a storage unit (for example, a register or a cache) in the chip, or may be a storage unit (for example, a read-only memory or a random access memory) that is in the second device and that is located outside the chip.

According to an embodiment of a ninth aspect, a first communication system is provided. The communication system may include the first communication apparatus according to the fifth aspect and the third communication apparatus according to the sixth aspect.

According to an embodiment of a tenth aspect, a second communication system is provided. The communication system may include the third communication apparatus according to the seventh aspect and the fourth communication apparatus according to the eighth aspect.

The first communication system and the second communication system may be a same communication system, or may be different communication systems.

According to an embodiment of an eleventh aspect, a computer storage medium is provided. The computer-readable storage medium stores instructions, and when the instructions are run on a computer, the computer is enabled to perform the method according to any one of the first aspect or the example embodiments of the first aspect.

According to an embodiment of a twelfth aspect, a computer storage medium is provided. The computer-readable storage medium stores instructions, and when the instructions are run on a computer, the computer is enabled to perform the method according to any one of the second aspect or the example embodiments of the second aspect.

According to an embodiment of a thirteenth aspect, a computer storage medium is provided. The computer-readable storage medium stores instructions, and when the instructions are run on a computer, the computer is enabled to perform the method according to any one of the third aspect or the example embodiments of the third aspect.

According to an embodiment of a fourteenth aspect, a computer storage medium is provided. The computer-readable storage medium stores instructions, and when the instructions are run on a computer, the computer is enabled to perform the method according to any one of the fourth aspect or the example embodiments of the fourth aspect.

According to an embodiment of a fifteenth aspect, a computer program product including instructions is provided. The computer program product stores the instructions, and when the computer program product runs on a computer, the computer is enabled to perform the method according to any one of the first aspect or the example embodiments of the first aspect.

According to an embodiment of a sixteenth aspect, a computer program product including instructions is provided. The computer program product stores the instructions, and when the computer program product runs on a computer, the computer is enabled to perform the method according to any one of the second aspect or the example embodiments of the second aspect.

According to an embodiment of a seventeenth aspect, a computer program product including instructions is provided. The computer program product stores the instructions, and when the computer program product runs on a computer, the computer is enabled to perform the method according to any one of the third aspect or the example embodiments of the third aspect.

According to an embodiment of an eighteenth aspect, a computer program product including instructions is provided. The computer program product stores the instructions, and when the computer program product runs on a computer, the computer is enabled to perform the method according to any one of the fourth aspect or the example embodiments of the fourth aspect.

In the embodiments of this application, when the terminal devices in the different cells in the system send the signals on the same time-frequency resource according to the rule provided in the embodiments of this application, for the same time domain resource used by the different terminal devices and the same subcarrier group, it can be ensured that when the terminal devices in the different cells send the signals in the same subcarrier group, the cross-correlation between the signals carried in the subcarrier group is relatively good, thereby reducing the interference between the signals in the cells and improving the channel estimation performance of the access network devices in the different cells. The first signal in the embodiments of this application may alternatively be a downlink signal. When the access network devices in the different cells in the system send the signals on the same time-frequency resource according to the foregoing rule, it can also be ensured that when the signals are sent in the same subcarrier group, the cross-correlation between the signals carried in the subcarrier group is relatively good, thereby reducing the interference between the signals in the cells and improving the channel estimation performance of the terminal devices in the different cells.

DESCRIPTION OF EMBODIMENTS

To make the objectives, the technical solutions, and advantages of the embodiments of this application clearer, the following further describes the embodiments of this application in detail with reference to the accompanying drawings.

In the embodiments of this application, "a/an" means a single individual, and does not indicate that "a/an" can only be one individual and cannot be applied to another individual. For example, in the embodiments of this application, "a terminal device" refers to a particular terminal device, and this does not mean that "a terminal device" can be applied only to one particular terminal device. The terms "system" and "network" may be used interchangeably in this application.

A reference to "an embodiment" (or "an implementation") or "embodiments" (or "implementations") in this application means that a specific feature, a structure, a feature, and the like that are described with the embodiments are included in at least one embodiment.

The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, understood as one, two, or more. For example, including at least one means including one, two, or more, and does not limit what are included. For example, including at least one of A, B, and C may represent the following cases: A is included, B is included, C is included, A and B are included, A and C are included, B and C are included, and A and B and C are included. "At least two" may be understood as two, three, or more. Similarly, an understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects.

Figure 1A:
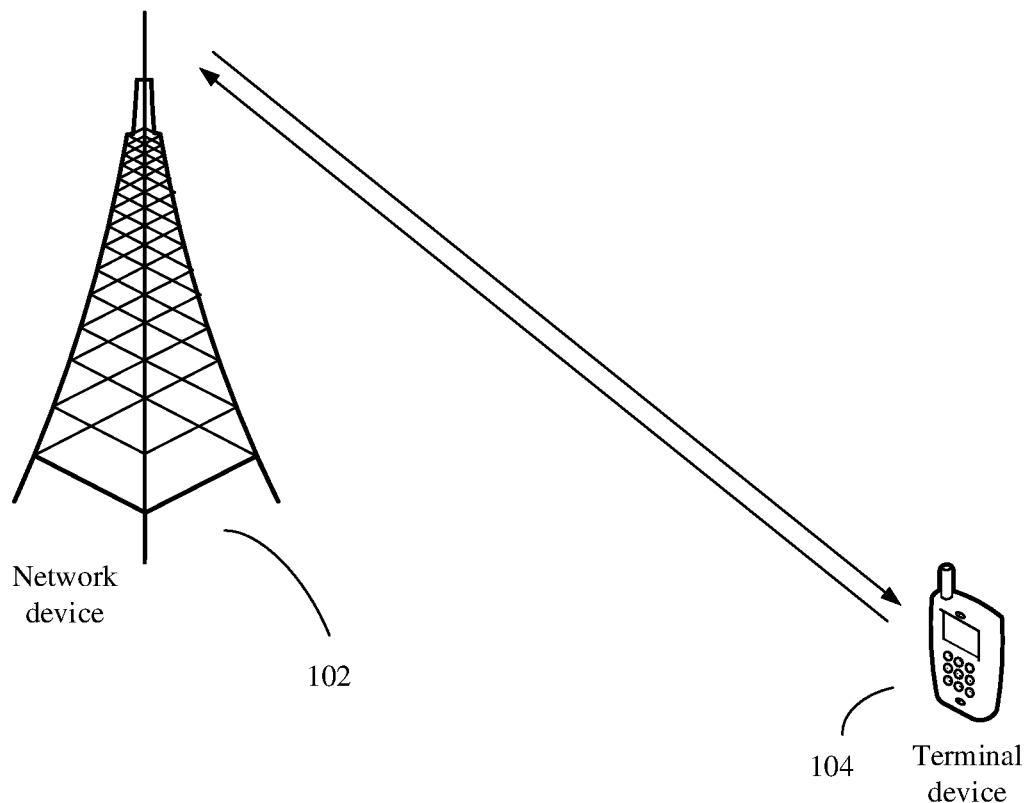
FIG. 1A is a schematic diagram of an application scenario according to an embodiment of this application.

FIG. 1A is a schematic diagram of communication between a wireless device and a wireless communication system. The wireless communication system may be a system that uses various radio access technologies (RAT), for example, an orthogonal frequency division multiple access (OFDMA) system, a single carrier frequency division multiple access (single carrier FDMA, SC-FDMA) system, or another system. For example, the wireless communication system may be a long term evolution (LTE) system, a new radio (NR) system, various evolved or converged systems, or a system using a future-oriented communication technology. A system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems.

For brevity, FIG. 1A shows communication between a network device 102 (for example, an access network device) and a wireless device 104 (for example, a terminal device). Usually, the wireless communication system may include any quantity of network devices and terminal devices. The wireless communication system may further include one or more core network devices, one or more devices configured to bear a virtualized network function, or the like. The access network device 102 may provide services for the wireless device by using one or more carriers. In the present disclosure, the access network device and the terminal device are collectively referred to as a communication apparatus.

In the present disclosure, the access network device 102 is an apparatus that is deployed in a radio access network to provide a wireless communication function for the terminal device. The access network device may include a macro base station (BS), a micro base station (also referred to as a small cell), a relay station, an access point, or the like in various forms. In systems that use different radio access technologies, names of devices that have a wireless access function may be different. For example, the device is referred to as an evolved NodeB (eNB or eNodeB) in an LTE system, and is referred to as a NodeB in a 3rd generation (3G) system, and the like. For ease of description, in the present disclosure, the device is referred to as an access network device for short, and sometimes is also referred to as a base station.

The wireless device in the embodiments of this application may include various handheld devices, vehicle-mounted devices, wearable devices, or computing devices that have a wireless communication function, or other processing devices connected to a wireless modem. The wireless device may be referred to as a terminal device, or may be referred to as a mobile station (MS), a terminal, user equipment (UE), or the like. The wireless device may include a subscriber unit, a cellular phone, a smart phone, a wireless data card, a personal digital assistant (PDA) computer, a tablet computer, a modem or a modem processor, a handheld device, a laptop computer, a netbook, a cordless phone, a wireless local loop (WLL) station, a Bluetooth device, a machine type communication (MTC) terminal, and the like. For ease of description, in the present disclosure, the wireless device is referred to as a terminal device or UE for short.

The wireless device may support one or more wireless technologies used for wireless communication, for example, 5G, LTE, WCDMA, CDMA, 1x, time division-synchronous code division multiple access (TS-SCDMA), GSM, 802.11, and the like. The wireless device may also support a carrier aggregation technology.

A plurality of wireless devices may perform a same service or different services, for example, a mobile broadband service, an enhanced mobile broadband (eMBB) service, and an ultra-reliable and low-latency communication (URLLC) service set by a terminal.

Figure 1B:
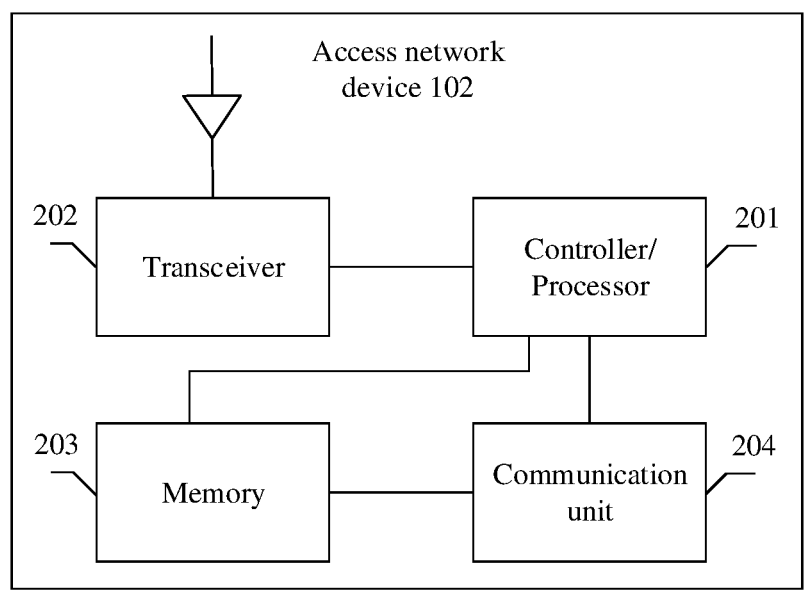
FIG. 1B is a schematic structural diagram of an access network device according to an embodiment of this application.

Further, an exemplary schematic structural diagram of the access network device 102 may be shown in FIG. 1B. The access network device 102 can perform a method provided in the embodiments of this application. The access network device 102 may include a controller or a processor 201 (where the processor 201 is used as an example below for description) and a transceiver 202. The controller/processor 201 is sometimes also referred to as a modem processor. The modem processor 201 may include a baseband processor (BBP) (not shown). The baseband processor processes a received digitalized signal, to extract information or a data bit transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to: support information receiving and sending between the access network device 102 and the terminal devices, and support wireless communication between the terminal devices. The processor 201 may be further configured to perform various functions for communication between the terminal device 104 and another network device. On an uplink, an uplink signal from the terminal device is received by using an antenna, demodulated by the transceiver 202, and further processed by the processor 201, to restore service data and/or signaling information sent by the terminal device. On a downlink, service data and/or a signaling message are/is processed by the terminal device 104 and modulated by the transceiver 202 to generate a downlink signal, and the downlink signal is transmitted to the terminal device 104 by using an antenna. The access network device 102 may further include a memory 203, and the memory 203 may be configured to store program code and/or data of the access network device 102. The transceiver 202 may include an independent receiver circuit and an independent transmitter circuit, or maybe a circuit implementing receiving and sending functions. The access network device 102 may further include a communication unit 204, configured to support communication between the access network device 102 and another network entity, for example, configured to support communication between the access network device 102 and a network device in a core network.

Optionally, the access network device may further include a bus. The transceiver 202, the memory 203, and the communication unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 1C:
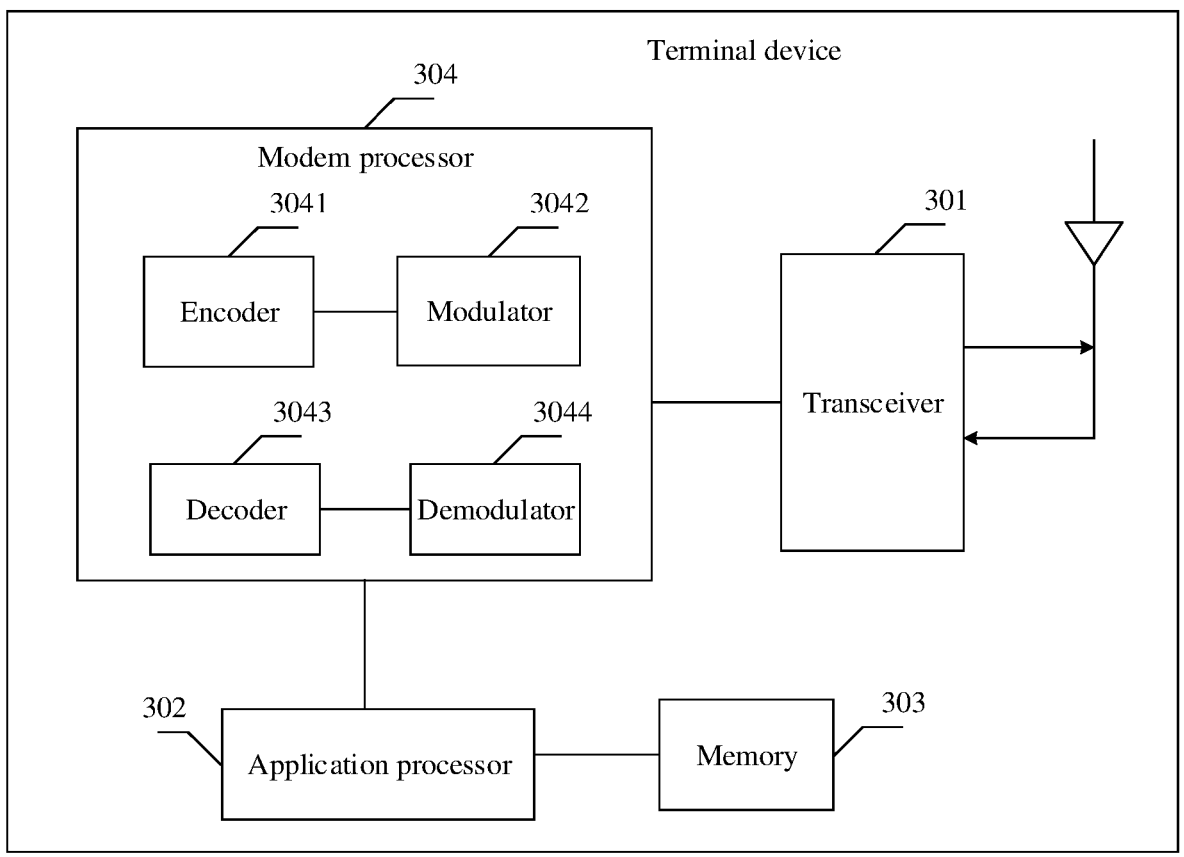
FIG. 1C is a schematic structural diagram of a terminal device according to an embodiment of this application.

FIG. 1C is an exemplary schematic structural diagram of a terminal device 300 in the foregoing wireless communication system. The terminal device 300 can perform a method provided in the embodiments of this application. The terminal device 300 includes a transceiver 301, an application processor 302, a memory 303, and a modem processor 304.

The transceiver 301 may adjust (for example, perform analog conversion, filtering, amplification, and up-conversion on) an output sample and generate an uplink signal. The uplink signal is transmitted to the base station in the foregoing embodiments by using an antenna. On a downlink, the antenna receives a downlink signal transmitted by an access network device. The transceiver 301 may adjust (for example, perform filtering, amplification, down-conversion, and digitalization on) a signal received from the antenna and provide an input sample.

The modem processor 304 is sometimes also referred to as a controller or a processor, and may include a baseband processor (BBP) (not shown). The baseband processor processes a received digitalized signal, to extract information or a data bit transmitted in the signal. Based on a requirement or an expectation, the BBP is usually implemented in one or more digital signal processors in the modem processor 304 or implemented as a separated integrated circuit (IC).

In an embodiment, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and may provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. The units perform processing based on a radio access technology used by a radio access network.

The modem processor 304 receives, from the application processor 302, digitalized data that may represent voice, data, or control information, and processes the digitalized data for transmission. The modem processor may support one or more of a plurality of wireless communication protocols of a plurality of communication systems, for example, LTE, new radio, a universal mobile telecommunications system (UMTS), and high speed packet access (HSPA). Optionally, the modem processor 304 may also include one or more memories.

Optionally, the modem processor 304 and the application processor 302 may be integrated in one processor chip.

The memory 303 is configured to store program code (sometimes referred to as a program, instructions, software, or the like) and/or data that are/is used to support the terminal device in communication.

It should be noted that, the memory 203 or the memory 303 may include one or more storage units, for example, may be a storage unit that is in the processor 201 or the modem processor 304 or the application processor 302 and that is used to store the program code, or may be an external storage unit independent of the processor 201 or the modem processor 304 or the application processor 302, or may be a component including a storage unit that is in the processor 201 or the modem processor 304 or the application processor 302 and an external storage unit that is independent of the processor 201 or the modem processor 304 or the application processor 302.

The processor 201 and the modem processor 304 may be processors of a same type or processors of different types. For example, the processor 201 and modem processor 304 may be implemented as a central processing unit (CPU), a general-purpose processor, a digital signal processor (DSP), an application-specific integrated circuit (ASIC), a field programmable gate array (FPGA), another programmable logic device, a transistor logic device, a hardware component, another integrated circuit, or any combination thereof. The processor 201 and the modem processor 304 may implement or execute various examples of logic blocks, modules, and circuits described with reference to content disclosed in the embodiments of this application. The processor may be a combination of components implementing computing functions, for example, a combination of one or more microprocessors, a combination of a DSP and a microprocessor, or a system-on-a-chip (SOC).

A person of ordinary skill in the art can understand that various explanatory logic blocks, modules, circuits, and algorithms described with reference to the various aspects disclosed in this application may be implemented as electronic hardware, instructions that are stored in a memory or another computer-readable medium and that are executed by a processor or another processing device, or a combination thereof. In an example, the device described in this specification may be used in any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person of ordinary skill in the art may use different manners to implement the described functions for each particular application, but it should not be considered that such implementation goes beyond the scope of this application.

In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference. In addition, the terms "include" and "have" in the embodiments, claims, and accompanying drawings of this application are not exclusive. For example, a process, method, system, product, or device including a series of steps or modules is not limited to the enumerated steps or modules, and may further include a step or module that is not enumerated.

The foregoing describes some concepts in the embodiments of this application. The following describes technical features in the embodiments of this application.

In a communication system, a reference signal is usually used to obtain a channel estimation matrix, to demodulate data information. In an LTE system and an NR system, a downlink DMRS is used for demodulation of a physical downlink shared channel (PDSCH) and a PDCCH for channel estimation.

A Gold sequence is a pseudo-random sequence with a characteristic of good correlation, and is generated in a simple manner and in a relatively large quantity. The Gold sequence may be obtained by performing modulo-2 addition on two preferred m-sequences. When a phase of one of the m-sequences is fixed, and a phase of the other m-sequence is changed, a different Gold sequence may be obtained. For example, there is a total of $2^n+1$ Gold sequences, each of which has a length of $2^n-1$.

In the NR system, a sequence obtained based on the Gold sequence is used for the downlink DMRS, and the sequence is mapped to a frequency domain subcarrier through QPSK modulation. For example, for a DMRS on a physical downlink control channel (PDCCH), a sequence $\{c(n)\}$ used for the DMRS is obtained by intercepting a Gold sequence having a length of $(2^{31}-1)$, where an initialization value of the Gold sequence is determined based on factors such as DMRS scrambling identifier (ID) of a terminal device, a subframe number of a subframe in which the DMRS is located, and a position of an OFDM symbol. The sequence $\{c(n)\}$ is modulated into $\{s(n)\}$ through QPSK, where $s(n)=(1-2c(2n))/\sqrt{2}+j(1-2c(2n+1))/\sqrt{2}$ and then the sequence $\{s(n)\}$ is carried on a subcarrier of the DMRS.

Although a complete Gold sequence has a characteristic of good cross-correlation, only a segment of the Gold sequence is used for the downlink DMRS in the NR system. Because a length of the segment of the Gold sequence is shortened, cross-correlation between segments of the Gold sequence is relatively poor. Particularly, after multipath is considered, a channel may be approximately considered as a flat and block-based channel. For example, channels of six adjacent resource blocks (RB) may be considered as a flat channel, and joint channel estimation may be performed. If an existing sequence that is based on a Gold sequence is used, a sequence that is based on a Gold sequence and that is carried on six RBs is shorter. Consequently, cross-correlation of DMRSs on the six RBs is worse. Therefore, after the cross-correlation of the DMRSs gets worse, a channel estimation result is not accurate enough when the DMRSs are used for channel estimation. Consequently, interference between signals is relatively strong, and channel estimation performance is affected.

In view of this, in the embodiments of this application, a part that is of a first signal and that is carried on the $k^{th}$ subcarrier in the $i^{th}$ subcarrier group in N subcarrier groups is $x_{i,n_{id}}(k)$, and a sequence $\{s_{i,n_{id}}(k)\}$ related to $x_{i,n_{id}}(k)$ is one of enumerated sequences. The enumerated sequences in the embodiments of this application are sequences with relatively good cross-correlation. Therefore, for two subcarrier groups, provided that selected $\{s_{i,n_{id}}(k)\}$ is two of the enumerated sequences, cross-correlation between signals carried in the two subcarrier groups can be ensured to be better than that in the conventional technology, thereby reducing interference between the signals and improving channel estimation performance.

The technical solutions provided in the embodiments of this application may be used in an LTE system, a 4th generation (4G) mobile communication technology system, a 4.5G system, a 5th generation (5G) mobile communication technology system, an NR system, or a system similar to NR, may alternatively be used in a future communication system, or may be used in another similar communication system.

The following describes the technical solutions provided in the embodiments of this application with reference to the accompanying drawings.

In an embodiment of this application, a sequence with a length $$\sum_{0}^{N-1} K_i$$

is obtained based on N sequences, and a length of each of the N sequences is represented as K where i=0, 1, ..., N−1. In certain embodiments, i may alternatively be set to 1 to N, and is merely used to identify the $i^{th}$ sequence with the length of K. The N sequences each with the length of $K_i$ may be the same, or may be different, or at least two sequences in the N sequences each with the length of $K_i$ may be the same. In addition, lengths of the N sequences each with the length of $K_i$ may be the same, or lengths of the at least two sequences are different. $K_i$ represents the $i^{th}$ sequence with the length of K, and a value of K is related to or not related to a value of i, or lengths of the N sequences each with the length of Ki may be the same. In this embodiment, the sequence with the length of $K_i$ is obtained based on one or more of the following sequences:

{1, −3, −1, 3, −1, 3, −3, −3, −3, 3, −3, −3, −1, 3, 1, −1, 1, −3},

{1, 1, −1, −1, 3, −1, 1, −3, 1, −1, −3, 1, 3, −1, 1, −1, 1, 1},

{1, −3, 3, 3, 3, −1, 1, −3, 1, 3, 1, 1, −1, 3, 1, 3, 1, −3},

{1, 1, 3, −1, −1, 3, −3, −3, −1, 1, −3, 3, −1, 1, 3, 1, 1},

{1, −3, 3, −1, −1, −1, −3, 1, 1, −1, 1, −3, −1, 3, −3, −1, 1, −3},

{1, 1, 3, 3, 3, 3, 1, 1, −3, 3, 1, 1, 3, −1, −3, −1, 1, 1},

{1, −3, −1, −1, 3, 3, 1, 1, −3, −1, −3, 1, −1, 3, −3, 3, 1, −3},
{1, 1, −1, 3, −1, −1, −3, 1, 1, 3, −3, −3, 3, −1, −3, 3, 1, 1},
{1, 1, 1, −3, −1, −3, 1, −1, 3, −3, −1, −3, 3, −1, −1, −1, 1, 1},
{1, −3, 1, 1, 3, 1, −3, −1, −1, 1, −1, 1, −1, 3, −1, −1, 1, −3},
{1, −3, −3, 1, −1, −3, 1, −1, 3, 1, 3, −3, −1, 3, −1, 3, 1, −3},
{1, 1, −3, −3, 3, 1, −3, −1, −1, −3, 3, 1, 3, −1, −1, 3, 1, 1},
{1, 1, −3, 1, −1, 1, 1, 3, −1, 1, 3, −3, 3, −1, 3, −1, 1, 1},
{1, −3, −3, −3, 3, −3, −3, 3, 3, −3, 3, 1, −1, 3, 3, −1, 1, −3},
{1, −3, 1, −3, −1, 1, 1, 3, −1, −3, −1, −3, −1, 3, 3, 3, 1, −3},
{1, 1, 1, 1, 3, −3, −3, 3, 3, 1, −1, 1, 3, −1, 3, 3, 1, 1},
{1, 1, −1, 3, 3, 3, −3, −3, 1, −1, −3, −3, 3, 3, 1, 3, 1, 1},
{1, −3, −1, −1, −1, −1, 1, −3, −3, 3, −3, 1, −1, −1, 1, 3, 1, −3},
{1, −3, 3, −1, 3, 3, −3, −3, 1, 3, 1, −3, −1, −1, 1, −1, 1, −3},
{1, 1, 3, 3, −1, −1, 1, −3, −3, −1, 1, 1, 3, 3, 1, −1, 1, 1},
{1, 1, 3, −1, 3, −1, −3, 1, −3, 3, 1, −3, 3, 3, −3, 3, 1, 1},
{1, −3, 3, 3, −1, 3, 1, 1, 1, −1, 1, 1, −1, −1, −3, 3, 1, −3},
{1, 1, −1, −1, −1, 3, 1, 1, 1, 3, −3, 1, 3, 3, −3, −1, 1, 1},
{1, −3, −1, 3, 3, −1, −3, 1, −3, −1, −3, −3, −1, −1, −3, −1, 1, −3},
{1, 1, 1, 1, −1, 1, −3, −1, 3, −3, −1, 1, 3, 3, −1, 3, 1, 1},
{1, −3, 1, −3, 3, −3, 1, −1, −1, 1, −1, −3, −1, −1, −1, 3, 1, −3},
{1, 1, −3, 1, 3, −3, 1, −1, −1, −3, 3, −3, 3, 3, −1, −1, 1, 1},
{1, −3, −3, −3, −1, 1, −3, −1, 3, 1, 3, 1, −1, −1, −1, −1, 1, −3},
{1, 1, −3, −3, −1, −3, −3, 3, −1, 1, 3, 1, 3, 3, 3, 1, 1},
or
{1, −3, −3, 1, 3, 1, 1, 3, 3, −3, 3, −3, −1, −1, 3, 3, 1, −3}.

Further, the sequence with the length of K, may be obtained by performing an operation such as phase rotation or a cyclic shift in time domain on one of the enumerated sequences. The sequence with the length of $$\sum_{0}^{N-1} K_i$$

may be obtained by combining the N sequences. In this embodiment, all the N sequences may be obtained based on one or more of the enumerated sequences, and the enumerated sequences corresponding to the N sequences may be the same, or may be different, or may be partially the same and partially different. In this embodiment, at least one of the N sequences needs to be obtained based on the foregoing enumerated sequences, and remaining sequences may be obtained based on another sequence.

The foregoing sequence is used to generate, for example, a DMRS, an SRS, or a signal for sending control information, so that it can be ensured that cross-correlation between signals in different cells is relatively low, and interference between the cells can be reduced.

In addition, a concept of a resource block (RB) is further involved in the embodiments of this application. One RB includes 12 consecutive subcarriers in frequency domain and one slot in time domain.

An embodiment of this application further provides a signal sending and receiving method in which the foregoing sequence is used. For a flowchart of the method, refer to FIG. 2. The method may be used in the scenario shown in FIG. 1A. In the following description process, an example in which the method provided in this embodiment is used in the application scenario shown in FIG. 1A is used. In addition, the method may be performed by two communication apparatuses. The two communication apparatuses are, for example, a first communication apparatus and a second communication apparatus. The first communication apparatus may be a network device or a communication apparatus (for example, a chip system) that can support the network device in implementing a function required in the method, or the first communication apparatus may be a terminal device or a communication apparatus (for example, a chip system) that can support the terminal device in implementing a function required in the method. This is the same for the second communication apparatus. The second communication apparatus may be a network device or a communication apparatus (for example, a chip system) that can support the network device in implementing a function required in the method, or the second communication apparatus may be a terminal device or a communication apparatus (for example, a chip system) that can support the terminal device in implementing a function required in the method. In addition, implementations of the first communication apparatus and the second communication apparatus are not limited. For example, the first communication apparatus may be a terminal device, and the second communication apparatus is a network device; both the first communication apparatus and the second communication apparatus are network devices; both the first communication apparatus and the second communication apparatus are terminal devices; or the first communication apparatus is a terminal device, and the second communication apparatus is a communication apparatus that can support a network device in implementing a function required in the method. For example, the network device is a base station.

For ease of description, the following uses an example in which the method is performed by a first device and a second device. Specifically, an example in which the first communication apparatus is the first device and the second communication apparatus is the second device is used. If the first device is, for example, a network device, and the second device is a terminal device, the first signal in this specification may be a downlink signal. Alternatively, if the first device is, for example, a terminal device, and the second device is, for example, a network device, the first signal in this specification may be an uplink signal.

S21: The first device determines a time-frequency resource, where the time-frequency resource includes N subcarrier groups, the $i^{th}$ subcarrier group in the N subcarrier groups includes $K_i$ subcarriers, N is a positive integer greater than or equal to 1, and $K_i$ is an integer greater than 1.

When the first device needs to send a signal, the first device may determine the time-frequency resource. For example, the first device may determine, based on system configuration information, for example, radio resource control (RRC) information or media access control control element (MAC CE) information, the time-frequency resource used to send the first signal. The time-frequency resource includes the N subcarrier groups, and the $i^{th}$ subcarrier group includes the $K_i$ subcarriers, where i is an integer from 1 to N. Quantities of subcarriers included in different subcarrier groups in the N subcarrier groups may be the same, or may be different. For example, quantities of subcarriers included in the N subcarrier groups are the same, quantities of subcarriers included in the N subcarrier groups are different, or quantities of subcarriers included in some of the N subcarrier groups are different and quantities of subcarriers included in remaining subcarrier groups are the same.

In addition, in this embodiment, the N subcarrier groups may be frequency-division-orthogonal, and the N subcarrier groups may occupy a same time domain resource, so that all parts of the first signal may be sent at a same moment by using the N subcarriers. In addition, in the $i^{th}$ subcarrier group, the $K_i$ subcarriers may be evenly spaced, the $K_i$ subcarriers may not be evenly spaced, or some subcarriers in the $K_i$ subcarriers may be evenly spaced and other subcarriers are not evenly spaced, or the like. This is not specifically limited.

S22: The first device sends the first signal on the N subcarrier groups, and the second device receives the first signal carried on the N subcarriers.

In this embodiment, a part that is of the first signal and that is carried on the $k^{th}$ subcarrier in the $i^{th}$ subcarrier group in the N subcarrier groups is $x_{i,n_{id}}(k)$, where k=0, 1, 2, ..., $K_i$−1, $x_{i,n_{id}}(k) = A \cdot c_i(k) \cdot b_{i,n_{id}}$, $c_i(k) = \mu \cdot \exp(\pi \cdot j \cdot s_{i,n_{id}}(k)/4) \cdot \exp(\alpha_{i,n_{id}} 2\pi k j/K_i) d_i(k)$, A and μ are both non-zero complex constants, $b_{i,n_{id}}$ may be a non-zero complex constant independent of k, j is a unit of imaginary numbers, $j = \sqrt{-1}$, $n_{id}$ is an identifier of the first signal or a cell identifier, and $\alpha_{i,n_{id}}$ is a real number. Optionally, $\{d_i(k)\}$ may be irrelevant to the identifier of the first signal or the cell identifier.

$b_{i,n_{id}}$ is irrelevant to k, that is, does not change depend on a change of k. For example, when k is different, a same value of $b_{i,n_{id}}$ may be used. Optionally, $b_{i,n_{id}}$ may be related to the identifier of the first signal or the cell identifier. For example, $b_{i,n_{id}}$ may be different when identifiers of the first signal are different, or $b_{i,n_{id}}$ may be different when cell identifiers are different. $b_{i,n_{id}}$ may be related to a subcarrier group. For example, different subcarrier groups may use a same $b_{i,n_{id}}$ or may use different $b_{i,n_{id}}$. Optionally, $b_{i,n_{id}}$ may be determined based on i and $n_{id}$. In the foregoing expression, $b_{i,n_{id}}$ may not be included. That is, $b_{i,n_{id}}$ may be 1. In this case, the expression may be simplified as follows: $x_{i,n_{id}}(k) = A \cdot c_i(k)$.

Different subcarrier groups may use a same $s_{i,n_{id}}(k)$ or different $s_{i,n_{id}}(k)$.

$\alpha_{i,n_{id}}$ may represent a cyclic shift in time domain, and in an example, $\alpha_{i,n_{id}} \in \{0, 1, 2, \ldots, K_i-1\}$. It should be noted that when $\alpha_{i,n_{id}} = 0$, it indicates that a cyclic shift in time domain does not need to be performed on the sequence. In this case, the sequence may be simplified as follows:

$$c_i(k) = \mu \cdot \exp(\pi \cdot j \cdot s_{i,n_{id}}(k)/4) \cdot d_i(k)$$

In addition, the sequence $\{d_i(k)\}$ may be any sequence. For example, the sequence $\{d_i(k)\}$ may alternatively be equal to an all−1 sequence. In this case, the expression may be simplified as follows: $c_i(k) = \mu \cdot \exp(\pi \cdot j \cdot s_{i,n_{id}}(k)/4) \cdot \exp(\alpha_{i,n_{id}} 2\pi k j/K_i)$. The sequence $\{d_i(k)\}$ is irrelevant to the identifier of the first signal. For example, when the identifiers of the first signal are different, the sequence $\{d_i(k)\}$ may be the same. Alternatively, it may be understood that one sequence $\{d_i(k)\}$ may correspond to at least two identifiers of the first signal. Alternatively, the sequence $\{d_i(k)\}$ is also irrelevant to the cell identifier. For example, when the cell identifiers are different, the sequence $\{d_i(k)\}$ may be the same. Alternatively, it may be understood that one sequence $\{d_i(k)\}$ may correspond to at least two cell identifiers.

In this embodiment, each of the N subcarrier groups carries a part of the first signal. In other words, the first device sends the part of the first signal on each of the N subcarrier groups. In addition, the at least two subcarrier groups in the N subcarrier groups carry different parts of the signals. For example, the at least two subcarrier groups separately carry different parts of the first signal. For example, the at least two subcarrier groups are the N subcarrier groups. In other words, signals carried in the N subcarrier groups are different. For example, the first device sends the first signal by using the N subcarrier groups, where the N subcarrier groups separately carry different parts of the first signal. In this way, the complete first signal can be sent by using the N subcarrier groups. Alternatively, the at least two subcarrier groups are only a proper subset of the N subcarrier groups. In this case, in addition to the at least two subcarrier groups, the N subcarrier groups further include other subcarrier groups. Signals carried in the other subcarrier groups may be the same. For example, the first device sends the first signal by using the N subcarrier groups, and the first signal includes a same part. Therefore, the at least two subcarrier groups may carry different parts of the first signal, the other subcarrier groups different from the at least two subcarrier groups in the N subcarrier groups may carry the same part of the first signal, so that the complete first signal can be sent by using the N subcarrier groups. Alternatively, the first device sends the first signal by using the N subcarrier groups. The first signal can be carried by using the at least two subcarrier groups, and an error-prone part or a relatively important part of the first signal can be carried by using other subcarrier groups different from the at least two subcarrier groups in the N subcarrier groups. In this case, the error-prone part or the relatively important part in the first signal may be transmitted for a plurality of times, thereby improving transmission reliability.

For example, the first device may first determine a sequence $\{x(n)\}$, where the sequence $\{x(n)\}$ may be a part of the first signal in the N subcarrier groups, and then separately intercept a part of the sequence $\{x(n)\}$ as a part of the first signal in each of the N subcarrier groups. In this case, the second device first determines a long sequence, and then intercepts the long sequence, where the intercepted sequences each is used as a sequence carried in each of the N subcarrier groups. Alternatively, the first device may directly determine the sequence based on each of the N subcarrier groups. In other words, the first device may directly determine the sequence carried in each of the N subcarrier groups. For example, the first device directly determines the sequence $\{x_{i,n_{id}}(k)\}$. In this case, the first device does not need to determine a long sequence, but directly determines the sequence carried in each subcarrier group. A specific determining manner of the first device is not limited in embodiments of this application.

If the first device is a terminal device, for example, the terminal device may independently determine a sequence after accessing a network, or a network device may configure a corresponding sequence for the terminal device when the terminal device accesses a network. That the terminal device directly determines the sequence $\{x_{i,n_{id}}(k)\}$ is used as an example. For example, after accessing the network, the terminal device determines a sequence from a first sequence group, and the sequence is used as the sequence $\{x_{i,n_{id}}(k)\}$. Alternatively, after accessing the network, the terminal device determines a sequence from a second sequence group, where the sequence is used as the sequence $\{s_{i,n_{id}}(k)\}$, and the sequence $\{x_{i,n_{id}}(k)\}$ may be obtained based on the sequence $\{s_{i,n_{id}}(k)\}$. Alternatively, when the terminal device accesses the network, the network device determines the sequence $\{x_{i,n_{id}}(k)\}$ and configures the sequence for the terminal device; or when the terminal device accesses the network, the network device determines the sequence $\{s_{i,n_{id}}(k)\}$ and configures the sequence for the terminal device, and then the terminal device may obtain the sequence $\{x_{i,n_{id}}(k)\}$ based on the sequence $\{s_{i,n_{id}}(k)\}$.

The sequence $\{s_{i,n_{id}}(k)\}$ may be one of the following sequences:

{1, −3, −1, 3, −1, 3, −3, −3, −3, 3, −3, −3, −1, 3, 1, −1, 1, −3},

{1, 1, −1, −1, 3, −1, 1, −3, 1, −1, −3, 1, 3, −1, 1, −1, 1, 1},

{1, −3, 3, 3, 3, −1, 1, −3, 1, 3, 1, 1, −1, 3, 1, 3, 1, −3},
{1, 1, 3, −1, −1, 3, −3, −3, −3, −1, 1, −3, 3, −1, 1, 3, 1, 1},
{1, −3, 3, −1, −1, −1, −3, 1, 1, −1, 1, −3, −1, 3, −3, −1, 1, −3},
{1, 1, 3, 3, 3, 3, 1, 1, −3, 3, 1, 1, 3, −1, −3, −1, 1, 1},
{1, −3, −1, −1, 3, 3, 1, 1, −3, −1, −3, 1, −1, 3, −3, 3, 1, −3},
{1, 1, −1, 3, −1, −1, −3, 1, 1, 3, −3, −3, 3, −1, −3, 3, 1, 1},
{1, 1, 1, −3, −1, −3, 1, −1, 3, −3, −1, −3, 3, −1, −1, −1, 1, 1},
{1, −3, 1, 1, 3, 1, −3, −1, −1, 1, −1, 1, −1, 3, −1, −1, 1, −3},
{1, −3, −3, 1, −1, −3, 1, −1, 3, 1, 3, −3, −1, 3, −1, 3, 1, −3},
{1, 1, −3, −3, 3, 1, −3, −1, −1, −3, 3, 1, 3, −1, −1, 3, 1, 1},
{1, 1, −3, 1, −1, 1, 1, 3, −1, 1, 3, −3, 3, −1, 3, −1, 1, 1},
{1, −3, −3, −3, 3, −3, −3, 3, 3, −3, 3, 1, −1, 3, 3, −1, 1, −3},
{1, −3, 1, −3, −1, 1, 1, 3, −1, −3, −1, −3, −1, 3, 3, 3, 1, −3},
{1, 1, 1, 1, 3, −3, −3, 3, 3, 1, −1, 1, 3, −1, 3, 3, 1, 1},
{1, 1, −1, 3, 3, 3, −3, −3, 1, −1, −3, −3, 3, 3, 1, 3, 1, 1},
{1, −3, −1, −1, −1, −1, 1, −3, −3, 3, −3, 1, −1, −1, 1, 3, 1, −3},
{1, −3, 3, −1, 3, 3, −3, −3, 1, 3, 1, −3, −1, −1, 1, −1, 1, −3},
{1, 1, 3, 3, −1, −1, 1, −3, −3, −1, 1, 1, 3, 3, 1, −1, 1, 1},
{1, 1, 3, −1, 3, −1, −3, 1, −3, 3, 1, −3, 3, 3, −3, 3, 1, 1},
{1, −3, 3, 3, −1, 3, 1, 1, 1, −1, 1, 1, −1, −1, −3, 3, 1, −3},
{1, 1, −1, −1, −1, 3, 1, 1, 1, 3, −3, 1, 3, 3, −3, −1, 1, 1},
{1, −3, −1, 3, 3, −1, −3, 1, −3, −1, −3, −3, −1, −1, −3, −1, 1, −3},
{1, 1, 1, 1, −1, 1, −3, −1, 3, −3, −1, 1, 3, 3, −1, 3, 1, 1},
{1, −3, 1, −3, 3, −3, 1, −1, −1, 1, −1, −3, −1, −1, −1, 3, 1, −3},
{1, 1, −3, 1, 3, −3, 1, −1, −1, −3, 3, −3, 3, 3, −1, −1, 1, 1},
{1, −3, −3, −3, −1, 1, −3, −1, 3, 1, 3, 1, −1, −1, −1, −1, 1, −3},
{1, 1, −3, −3, −1, −3, −3, 3, −1, 1, 3, 1, 3, 3, 3, 1, 1}, or
{1, −3, −3, 1, 3, 1, 1, 3, 3, −3, 3, −3, −1, −1, 3, 3, 1, −3}.

The sequences enumerated above each use $K_i=18$ as an example. For example, after multipath is considered, a channel may be approximately considered as a flat and block-based channel. For example, channels of six adjacent RBs may be considered as a flat channel, and joint channel estimation may be performed. On the basis of this embodiment, the sequence with a length of 18 may be exactly placed in six RBs. A largest value of cross-correlation between the 30 sequences enumerated above is 0.48977, and an average value is 0.4185. Correspondingly, in an NR system, sequences used are segments of the Gold sequence, a largest value of cross-correlation between the sequences is greater than 0.9, and an average value of the sequences is 0.48829. Therefore, by using the foregoing 30 sequences, it can be ensured that DMRSs on the six RBs have good cross-correlation, interference between signals is relatively small, and channel estimation performance is improved. In this embodiment, $K_i$ is not limited to being equal to 18, and may be another value. The 30 sequences enumerated above may belong to the second sequence group. In addition to the foregoing 30 sequences, the second sequence group may further include another sequence. For example, the second sequence group may further include another sequence whose $K_i$ is 18, or may further include a sequence whose value of k is another value. These sequences are also applicable to this embodiment. This is not specifically limited in embodiments of the present disclosure.

As mentioned above, the first device may determine the sequence $\{x_{i,n_{id}}(k)\}$. For example, the sequence $\{x_{i,n_{id}}(k)\}$ may be determined based on the identifier of the first signal or the cell identifier. For example, the first device may determine the sequence $\{x_{i,n_{id}}(k)\}$ from the first sequence group based on the identifier of the first signal or the cell identifier. Alternatively, the terminal device may also determine the sequence $\{s_{i,n_{id}}(k)\}$. For example, the sequence $\{s_{i,n_{id}}(k)\}$ may be determined based on the identifier of the first signal or the cell identifier. For example, the terminal device may determine the sequence $\{s_{i,n_{id}}(k)\}$ from the second sequence group based on the identifier of the first signal or the cell identifier, or determine, based on the identifier of the first signal or the cell identifier, the sequence $\{s_{i,n_{id}}(k)\}$ from the 30 sequences enumerated above that are included in the second sequence group.

In addition, one identifier of the first signal may correspond to one terminal device, or one identifier of the first signal may correspond to one group of terminal devices. In other words, a same identifier of the first signal is applicable to all terminal devices in a same group of terminal devices. Alternatively, one identifier of the first signal may correspond to one cell, that is, a same identifier of the first signal is applicable to all terminal devices in a same cell. For example, one identifier of the first signal corresponds to one terminal device, and different terminal devices may correspond to different identifiers of the first signal. Alternatively, one identifier of the first signal corresponds to one group of terminal devices, and different groups of terminal devices may correspond to different identifiers of the first signal. Alternatively, one identifier of the first signal corresponds to one cell, and different cells may correspond to different identifiers of the first signal. For example, if the first device is a network device, the first device determines an identifier that is of the first signal and that corresponds to the second device, and determines the sequence $\{x_{i,n_{id}}(k)\}$ or the sequence $\{s_{i,n_{id}}(k)\}$ based on the identifier of the first signal.

To send the first signal on the N subcarrier groups, the first device first needs to generate the first signal. In an optional manner of generating the first signal, a process of generating the first signal is specifically as follows: The first device maps the sequence $\{x(n)\}$ to the N subcarrier groups, to generate the first signal, and sends the first signal to the network device.

Figure 3:
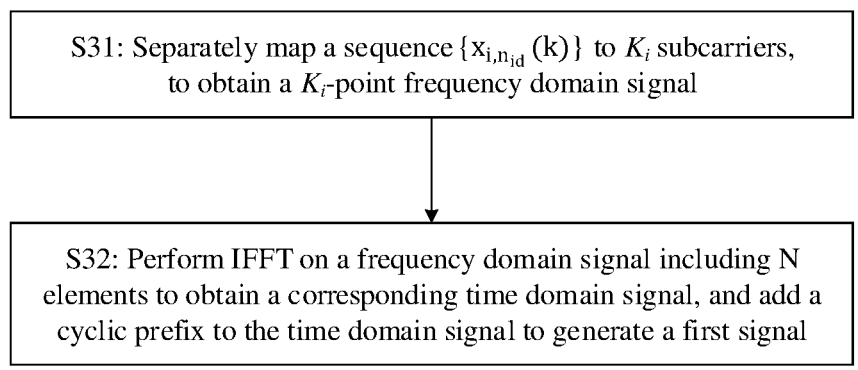
FIG. 3 is a schematic flowchart of generating a part of a first signal by a first device according to an embodiment of this application.

Optionally, the $i^{th}$ subcarrier group is used as an example. A specific process in which the first device separately maps the sequence $\{x_{i,n_{id}}(k)\}$ including the $K_i$ elements to the $K_i$ subcarriers to obtain a part of the first signal is shown in FIG. 3, and the following steps are included.

S31: The first device separately maps the sequence $\{x_{i,n_{id}}(k)\}$ to the $K_i$ subcarriers, to obtain a $K_i$-point frequency domain signal.

During specific implementation, the $K_i$-point frequency domain signal is a frequency domain signal including the $K_i$ elements.

Figure 4A:
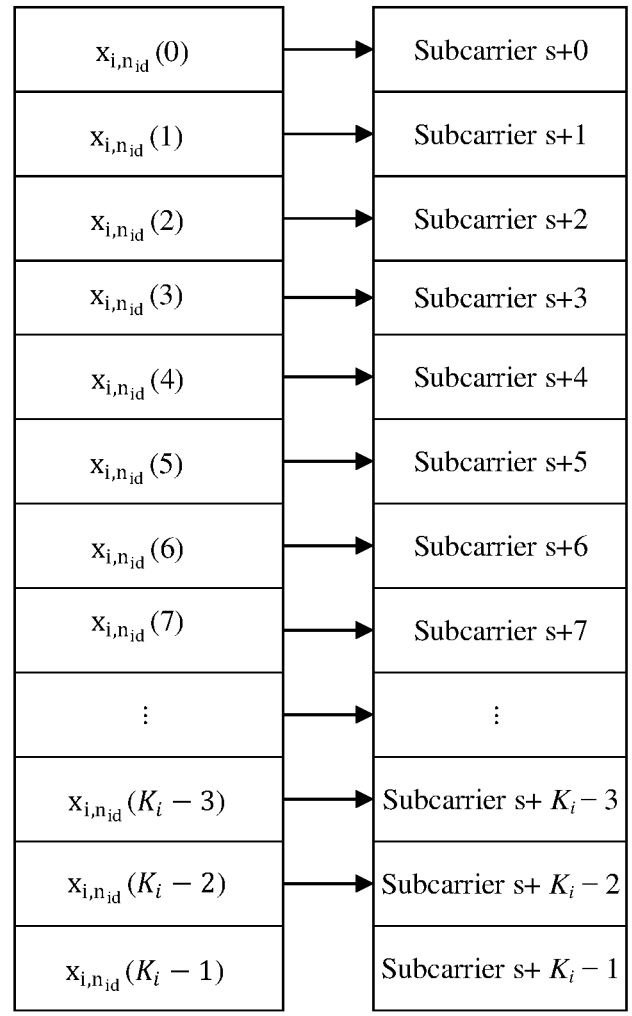
FIG. 4A and FIG. 4B each is a schematic diagram of mapping a sequence $\{x_{i,n_{id}}(k)\}$ including $K_i$ elements to $K_i$ subcarriers according to an embodiment of this application.
Figure 4B:
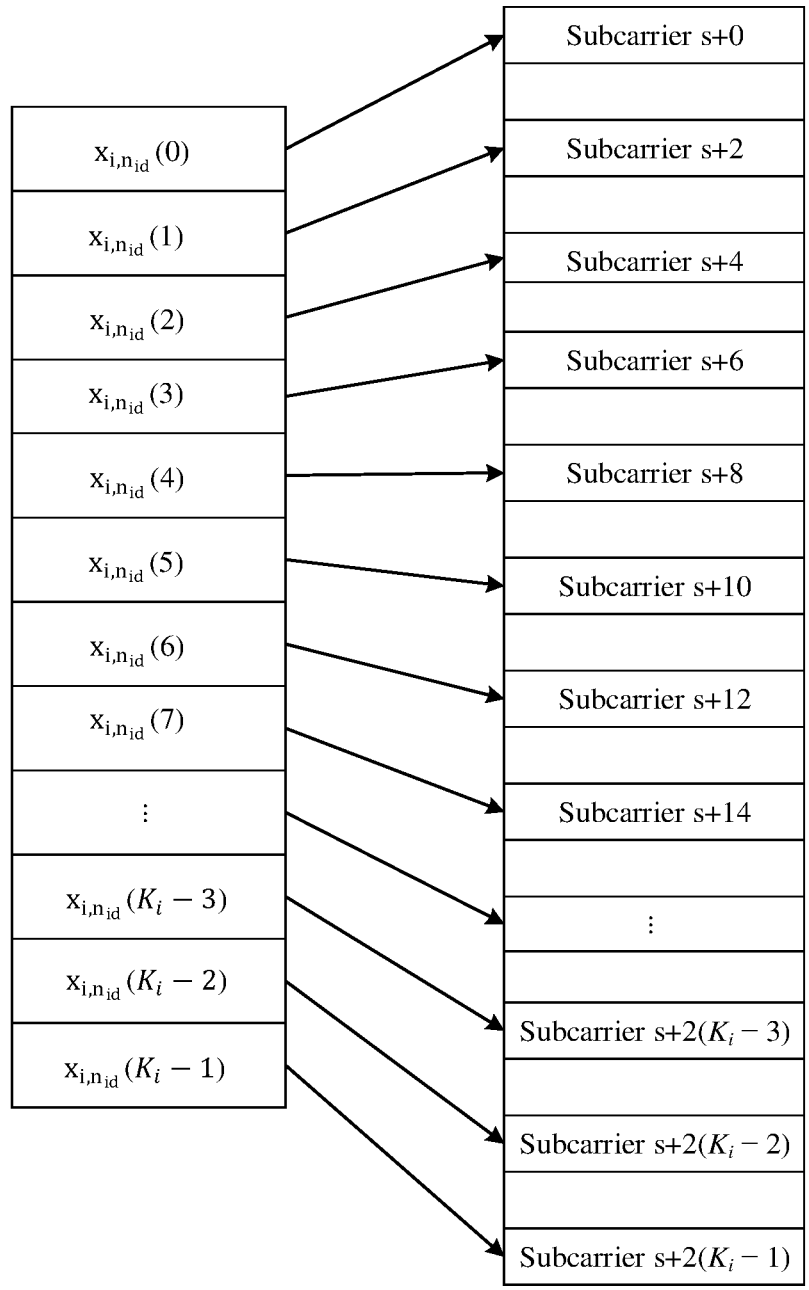

In FIG. 4A and FIG. 4B disclosed in the embodiments of this application, s indicates an index of the $1^{st}$ subcarrier, in subcarriers in a communication system, in the N subcarriers to which the sequence $\{x_{i,n_{id}}(k)\}$ is mapped.

Optionally, the first device separately maps the $K_i$ elements in the sequence $\{x_{i,n_{id}}(k)\}$ to the $K_i$ consecutive subcarriers. As shown in FIG. 4A, optionally, elements $x_{i,n_{id}}(0)$ to $x_{i,n_{id}}(K_i-1)$ in the sequence $\{x_{i,n_{id}}(k)\}$ are respectively mapped to the $K_i$ consecutive subcarriers, where the subcarriers are numbered as s+0, s+1, ..., and s+$K_i$−1.

In an example in which the first device separately maps the $K_i$ elements in the sequence $\{x_{i,n_{id}}(k)\}$ to the $K_i$ consecutive subcarriers, the first device sequentially maps the $K_i$ elements in the sequence $\{x_{i,n_{id}}(k)\}$ to the $K_i$ consecutive subcarriers in descending order of the subcarriers. One element in the sequence $\{x_{i,n_{id}}(k)\}$ is mapped to one frequency domain subcarrier. The frequency domain subcarrier is a minimum unit of a frequency domain resource.

In another possible example in which the first device separately maps the $K_i$ elements in the sequence $\{x_{i,n_{id}}(k)\}$ to the $K_i$ consecutive subcarriers, the first device sequentially maps the $K_i$ elements in the sequence $\{x_{i,n_{id}}(k)\}$ to the $K_i$ consecutive subcarriers in ascending order of the subcarriers. Mapping one element in the sequence $\{x_{i,n_{id}}(k)\}$ to one subcarrier means that the element is carried on the subcarrier. After mapping, when the first device sends data by using a radio frequency, it is equivalent to that the element is sent on the subcarrier. Positions of the $K_i$ subcarriers in a plurality of subcarriers in the communication system may be predefined, or may be configured by the network device by using signaling.

Alternatively, the first device may also separately map the $K_i$ elements in the sequence $\{x_{i,n_{id}}(k)\}$ to the $K_i$ evenly spaced subcarriers. As shown in FIG. 4B, for example, a quantity of subcarriers spaced between the $K_i$ subcarriers is 1, and the $K_i$ subcarriers are evenly spaced in frequency domain. A spacing between subcarriers to which elements $x_{i,n_{id}}(0)$ to $x_{i,n_{id}}(N-1)$ in the sequence $\{x_{i,n_{id}}(k)\}$ are mapped is one subcarrier. Specifically, the elements are respectively mapped to $K_i$ evenly spaced subcarriers, and the subcarriers are numbered as s+0, s+2, . . . , and s+2($K_i$−1).

S32: The first device performs inverse fast Fourier transformation (IFFT) on a frequency domain signal including the N elements to obtain a corresponding time domain signal, and adds a cyclic prefix to the time domain signal to generate the first signal.

It should be noted that, in this embodiment, a manner of generating the first signal is not limited to the implementation provided in the embodiment shown in FIG. 3. For example, the first device may alternatively obtain a sequence $\{y(k)\}$ by using a molding filter for the sequence $\{x_{i,n_{id}}(k)\}$, and then modulate the sequence $\{y(k)\}$ onto a carrier to obtain a part of the first signal, and the like.

Optionally, when S32 is performed, a time domain signal obtained by the first device by performing IFFT on a generated N-point frequency domain signal is an orthogonal frequency division multiplexing (OFDM) symbol. When performing S22, the first device sends the first signal by using the radio frequency. In other words, the first device sends, on the N subcarriers, the first signal that carries the sequence $\{x(n)\}$.

The first device may send, on one OFDM symbol, the first signal that carries the sequence $\{x(n)\}$. Alternatively, the first signal that carries the sequence $\{x(n)\}$ may be sent on a plurality of OFDM symbols.

In an optional manner, the first signal may be a DMRS, a sounding reference signal (SRS), control information, or the like. The first signal in embodiments of this application includes but is not limited to only the foregoing information.

In another optional manner, the first signal is a signal used to carry communication information. During specific implementation, the communication information may be carried in a sequence selection manner, or may be carried in a sequence modulation manner, but is not limited thereto. The communication information includes, for example, data and/or control information.

For example, the first device is a terminal device. For example, the sequence selection manner is: allocating $2^n$ orthogonal sequences to one terminal device. The $2^n$ orthogonal sequences are, for example, $2^n$ cyclic shifts of one root sequence, and the $2^n$ orthogonal sequences can carry n-bit information. For example, the orthogonal sequences are four sequences numbered 0, 1, 2, and 3.00 corresponds to the sequence 0, 01 corresponds to the sequence 1, 10 corresponds to the sequence {2}, and 11 corresponds to the sequence 3. In this way, the four sequences can carry two-bit information.

For example, the sequence modulation manner is: allocating one sequence to one terminal device, and generating a modulation symbol for information that needs to be transmitted by the terminal device. The modulation symbol includes but is not limited to a binary phase shift keying (BPSK) symbol, a QPSK symbol, an 8-quadrature amplitude modulation (quadrature amplitude modulation, QAM) symbol, a 16 QAM symbol, and the like. The modulation symbol is multiplied by the sequence to generate an actual transmission sequence. For example, one BPSK symbol may be 1 or −1, and for one sequence $\{x_{i,n_{id}}(k)\}$, a sent sequence may be $\{x_{i,n_{id}}(k)\}$ or $\{-x_{i,n_{id}}(k)\}$ after modulation is performed based on the BPSK symbol.

In an example, as described above, the first device may determine the sequence $\{x(n)\}$ based on A, a sequence $\{c_i(n \bmod K_i)\}$, and a sequence $\{b(n)\}$. It should be noted that for the sequence modulation manner, different information may be carried by using different values of A in the sequence $\{x(n)\}$.

For example, A may be a modulation symbol. In this case, A is obtained after a data information bit or a control information bit is modulated. A is carried on the N elements included in the sequence $\{x(n)\}$, and A does not change with n.

Alternatively, A is a constant. For example, A=1. For example, A may be a symbol known to both the first device and the second device. A may also indicate an amplitude.

It should be noted that, that A is a constant in a time unit does not mean that A is fixed, and A may change when the first signal is sent at different moments. For example, all the N elements included in the sequence $\{x(n)\}$ are reference signals, and A is an amplitude of a reference signal. When sending the first signal for the first time, the first device may send the first signal based on A=1. When sending the first signal for the second time, the first device may send the first signal based on A=2.

The second device may receive a signal on the N subcarriers based on predefined or configured positions of the N subcarriers in subcarriers in the communication system.

For example, the second device may obtain the first signal on the N subcarriers on N consecutive subcarriers, or obtain the first signal on the N subcarriers on N evenly spaced subcarriers.

S23: The second device obtains the $K_i$ elements in the sequence $\{x_{i,n_{id}}(k)\}$ carried by the first signal.

Descriptions of the sequence $\{x_{i,n_{id}}(k)\}$, related elements, and the like are relatively described in detail in S22.

For example, the second device may obtain a signal on the $K_i$ subcarriers on $K_i$ consecutive subcarriers, or obtain a signal on the $K_i$ subcarriers on $K_i$ evenly spaced subcarriers, and remove a cyclic prefix of the obtained signal to obtain a time domain signal, to obtain a frequency domain signal including the $K_i$ elements, and then determine the $K_i$ elements in the sequence $\{x_{i,n_{id}}(k)\}$ based on the frequency domain signal including the $K_i$ elements. For each of the N subcarrier groups, the terminal device may obtain, in this manner, $K_i$ elements in a sequence carried in a corresponding subcarrier group.

S24: The second device processes, based on the $K_i$ elements in the sequence $\{x_{i,n_{id}}(k)\}$, a part that is of the first signal and that is carried in the $i^{th}$ subcarrier group in the N subcarrier groups.

Figure 5A:
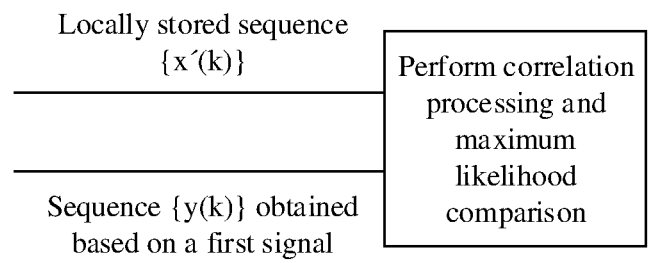
FIG. 5A is a schematic diagram of processing a first signal by a second device according to an embodiment of this application.
Figure 5B:
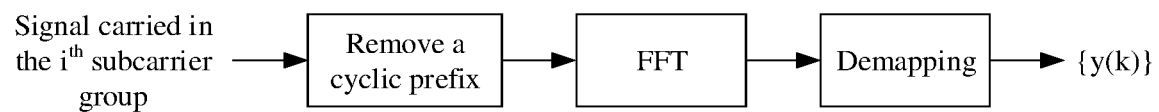
FIG. 5B is a schematic diagram of processing a first signal by a second device according to an embodiment of this application.

Optionally, a process in which the second device processes the part that is of the first signal and that is carried in the $i^{th}$ subcarrier group in the N subcarrier groups may be shown in FIG. 5A. The second device separately performs correlation processing on the obtained sequence {y(k)} and all possible sequences {x'(k)}, and performs maximum likelihood comparison, to obtain the data transmitted by the first device. The sequence {y(k)} is obtained by the second device based on a received signal carried in the $i^{th}$ subcarrier group. Referring to FIG. 5B, the second device removes a cyclic prefix from the received signal carried in the $i^{th}$ subcarrier group, and then performs processing such as fast Fourier transformation (FFT) and demapping, to obtain the sequence {y(k)}. {x'(k)} is a local sequence generated by {x(k)}. With reference to the foregoing descriptions, for example, for two-bit information, a combination of values is {(0,0), (0,1), (1,0), (1,1)}. For example, when the two-bit information is (0,0), the obtained sequence x'(k) is a sequence $x'_1(k)$; when the two-bit information is (0,1), the obtained sequence x'(k) is a sequence $x'_2(k)$; when the two-bit information is (1,0), the obtained sequence x'(k) is a sequence $x'_3(k)$; and when the two-bit information is (1,1), the obtained sequence x'(k) is a sequence $x'_4(k)$. The four sequences $x'_1(k)$, $x'_2(k)$, $x'_3(k)$, and $x'_4(k)$ may be cyclic shift sequences of a same sequence, and the sequence {y(k)} is separately correlated to $x'_1(k)$, $x'_2(k)$, $x'_3(k)$, and $x'_4(k)$ to obtain four correlation values. A value of the two-bit information corresponding to a largest correlation value is the data obtained by the second device. For example, if the largest correlation value is obtained by correlating the sequence {y(k)} with $x'_1(k)$, the second device determines that the two-bit information transmitted by the first device is (0,0).

The second device may perform similar processing on a signal carried in each of the N subcarrier groups, to obtain the first signal.

To process the part that is of the first signal and that is carried in the $i^{th}$ subcarrier group in the N subcarrier groups, the second device also needs to learn of the identifier of the first signal or the cell identifier. For example, the first device may send first signaling, and the first signaling is used to indicate the identifier of the first signal. In this case, after receiving the first signaling from the first device, the second device may determine the identifier of the first signal based on the first signaling. As described above, one identifier of the first signal may correspond to one terminal device, one identifier of the first signal may correspond to one group of terminal devices, or one identifier of the first signal may correspond to one cell. For example, the first device is a network device, and the second device is a terminal device. In this case, if the identifier that is of the first signal and that is sent to the terminal device is the identifier that is of the first signal and that corresponds to the terminal device, the network device may send the identifier of the first signal to the terminal device by using user equipment specific (UE specific) signaling. In other words, the first signaling may be the user equipment specific signaling. Alternatively, if the identifier that is of the first signal and that is sent to the terminal device is the identifier that is of the first signal and that corresponds to a terminal device group in which the terminal device is located, the network device may send the identifier of the first signal to the terminal device by using user equipment group specific signaling. Alternatively, the network device may multicast (or broadcast) the identifier of the first signal to each terminal device in the terminal device group by using the user equipment group specific signaling. In other words, the first signaling may be the user equipment group specific signaling. Alternatively, if the identifier that is of the first signal and that is sent to the terminal device is the identifier that is of the first signal and that corresponds to a cell in which the terminal device is located, the network device may broadcast, by using cell-specific signaling, the identifier of the first signal to the cell in which the terminal device is located. In other words, the first signaling may be the cell-specific signaling.

Processing the first signal by the second device may be separately processing each subcarrier group, or may be processing the entire first signal. In the foregoing description process, the separately processing each subcarrier group is mainly used as an example. In addition, the processing of the first signal by the second device may be related to a local sequence, or may be channel estimation performed based on the received signal and the local sequence. This is not specifically limited.

In this embodiment, the part that is of the first signal and that is carried on the $k^{th}$ subcarrier in the $i^{th}$ subcarrier group in the N subcarrier groups is $x_{i,n_{id}}(k)$, and the sequence $\{s_{i,n_{id}}(k)\}$ related to $x_{i,n_{id}}(k)$ is one of the enumerated sequences. The enumerated sequences are sequences with relatively good cross-correlation. Therefore, when terminal devices in different cells in a system send signals on a same time-frequency resource according to the foregoing rule, for a same time domain resource used by different terminal devices and a same subcarrier group, provided that $\{s_{i,n_{id}}(k)\}$ selected by the different terminal devices are different sequences in the enumerated sequences, it can be ensured that when the terminal devices in the different cells send signals in a same subcarrier group, cross-correlation between the signals carried in the subcarrier group is relatively good, thereby reducing interference between the signals in the cells and improving channel estimation performance of access network devices in the different cells. The first signal in the embodiments of this application may alternatively be a downlink signal. When access network devices in different cells in a system send signals on a same time-frequency resource according to the foregoing rule, provided that $\{s_{i,n_{id}}(k)\}$ selected by the access network devices in the different cells are different sequences in the enumerated sequences, it can be ensured that when signals are sent in a same subcarrier group, cross-correlation between the signals carried in the subcarrier group is relatively good, thereby reducing interference between the signals in the cells and improving channel estimation performance of terminal devices in the different cells.

To resolve a same technical problem, this application further provides a sequence. In this embodiment, the first signal sent on one or more subcarrier groups is generated based on a sequence intercepted from a long sequence. The long sequence is obtained based on a Zadoff-Chu (ZC) sequence whose length is $M_{zc}$, a length of the long sequence is M and is a value related to a system bandwidth, where $M_{zc}$ is related to M. q corresponding to the ZC sequence or the long sequence meets $q=\lfloor \bar{q}+\frac{1}{2} \rfloor$, where $\bar{q}=M_{zc} \cdot (n_{id}+1)/p$, $n_{id} \in \{0, 1, 2, \ldots, p-2\}$, and p is a prime number greater than 2. Further, the intercepted sequence may be determined based on frequency domain positions of the one or more subcarrier groups.

Figure 6:
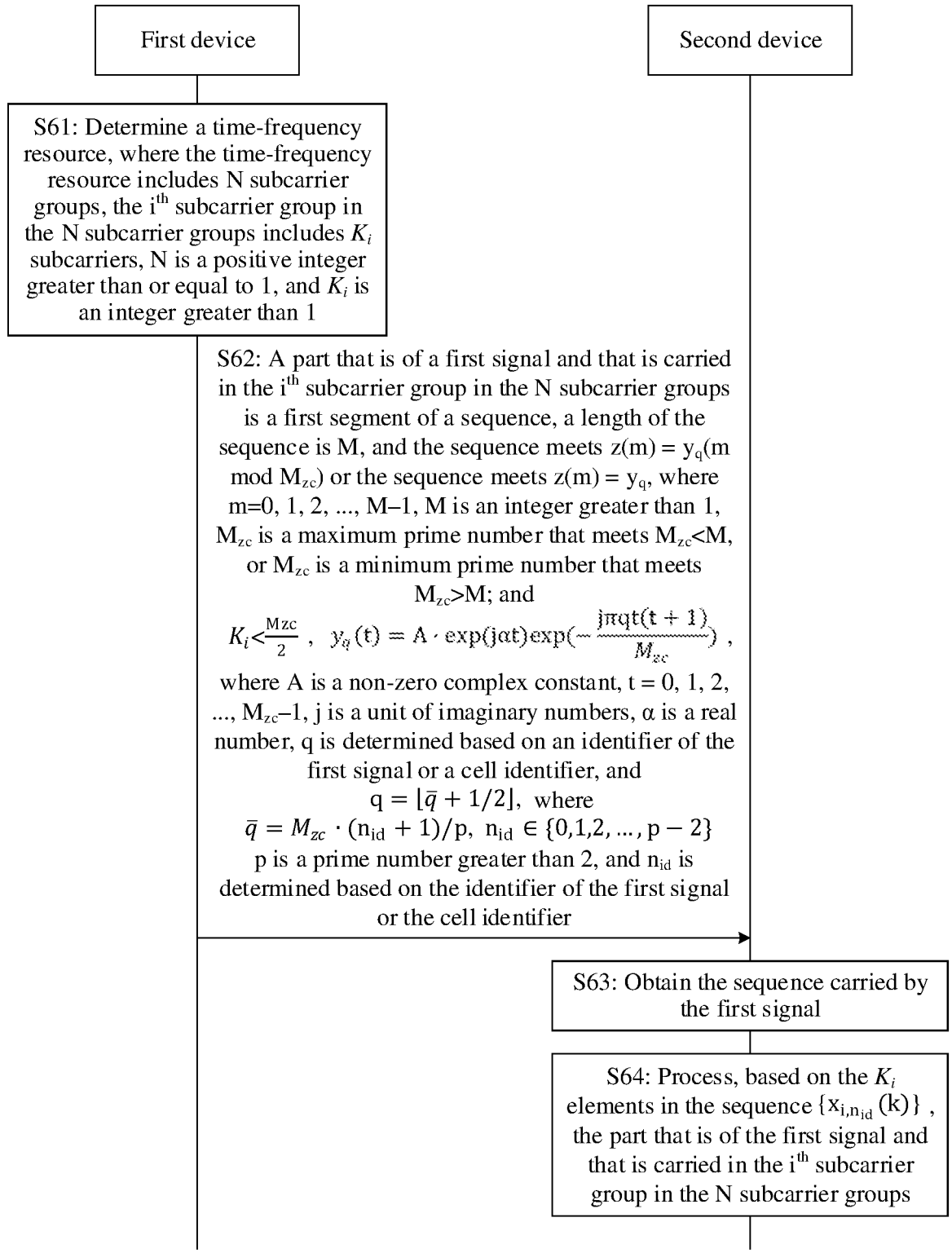
FIG. 6 is a flowchart of a second signal sending and receiving method according to an embodiment of this application.

The following further provides a signal sending and receiving method based on the foregoing sequence. For a flowchart of the method, refer to FIG. 6. For same content in this embodiment, refer to the foregoing descriptions. Details are not repeated again in this embodiment. The method may be used in the scenario shown in FIG. 1A. In the following description process, an example in which the method provided in this embodiment is used in the application scenario shown in FIG. 1A is still used. In addition, the method may be performed by two communication apparatuses. The two communication apparatuses are, for example, a third communication apparatus and a fourth communication apparatus. The third communication apparatus may be a network device or a communication apparatus (for example, a chip system) that can support the network device in implementing a function required in the method, or the third communication apparatus may be a terminal device or a communication apparatus (for example, a chip system) that can support the terminal device in implementing a function required in the method. This is the same for the fourth communication apparatus. The fourth communication apparatus may be a network device or a communication apparatus (for example, a chip system) that can support the network device in implementing a function required in the method, or the fourth communication apparatus may be a terminal device or a communication apparatus (for example, a chip system) that can support the terminal device in implementing a function required in the method. In addition, implementations of the third communication apparatus and the fourth communication apparatus are not limited. For example, the third communication apparatus may be a terminal device, and the fourth communication apparatus is a network device; both the third communication apparatus and the fourth communication apparatus are network devices; both the third communication apparatus and the fourth communication apparatus are terminal devices; or the third communication apparatus is a terminal device, and the fourth communication apparatus is a communication apparatus that can support a network device in implementing a function required in the method. For example, the network device is a base station.

For ease of description, the following uses an example in which the method is performed by a first device and a second device. Specifically, an example in which the third communication apparatus is the first device and the fourth communication apparatus is the second device is used. If the first device is, for example, a network device, and the second device is a terminal device, the first signal in this specification may be a downlink signal. Alternatively, if the first device is, for example, a terminal device, and the second device is, for example, a network device, the first signal in this specification may be an uplink signal.

S61: The first device determines a time-frequency resource, where the time-frequency resource includes N subcarrier groups, the $i^{th}$ subcarrier group in the N subcarrier groups includes $K_i$ subcarriers, N is a positive integer greater than or equal to 1, and $K_i$ is an integer greater than 1.

For example, $K_i$ is determined based on a bandwidth part (BWP) in which the N subcarrier groups are located. When BWPs are different, $K_i$ may be different.

When the first device needs to send a signal, the first device may determine the time-frequency resource. For example, the determined time-frequency resource includes the N subcarrier groups. For meanings of the N subcarrier groups, refer to the foregoing embodiment.

S62: The first device sends the first signal on the N subcarrier groups, and the second device receives the first signal carried on the N subcarrier groups.

A part that is of the first signal and that is carried in the $i^{th}$ subcarrier group in the N subcarrier groups is a first segment of a sequence $\{z_q(m)\}$, a length of the sequence $\{z_q(m)\}$ is M, and the sequence $\{z_q(m)\}$ meets $z_q(m)=y_q(m \bmod M_{zc})$, where $m=0, 1, 2, \ldots, M-1$, and M is an integer greater than 1. It may be understood that the sequence $\{z_q(m)\}$ is obtained by performing interception or cyclic extension on a ZC sequence. $M_{zc}$ is a maximum prime number that meets $M_{zc}<M$, or $M_{zc}$ is a minimum prime number that meets $M_{zc}>M$; and $$K_i < \frac{M_{zc}}{2}, \quad y_q(t) = A\exp(j\alpha t)\exp\left(-\frac{j\pi qt(t+1)}{M_{zc}}\right),$$

where A is a non-zero complex constant, $t=0, 1, 2, \ldots, M_{zc}-1$, j is a unit of imaginary numbers, j=, a is a real number, q is determined based on an identifier of the first signal or a cell identifier, and $q=\lfloor \bar{q}+\frac{1}{2} \rfloor$, where $\bar{q}=M_{zc}\cdot(n_{id}+1)/p$, $n_{id} \in \{0, 1, 2, \ldots, p-2\}$, p is a prime number greater than 2, and $n_{id}$ is determined based on the identifier of the first signal or the cell identifier.

It should be noted that $M_{zc}$ is determined based on M. If $M_{zc}$ is a minimum prime number that meets $M_{zc}>M$, equivalently, the foregoing expression may be expressed as $z_q(m)=y_q(m)$. Therefore, it is easy to understand that $z_q(m)=y_q(m)$ may be a special case of $z_q(m)=y_q(m \bmod M_{zc})$.

A value of M is determined based on a maximum system bandwidth or a bandwidth part. For example, if the maximum system bandwidth is G RBs, and a quantity of subcarriers that can be used to send the first signal in each RB is H, the value of M may be G*H. A value of $d_i$ is determined based on a position, in the system bandwidth or the bandwidth part, of a subcarrier in the $i^{th}$ subcarrier group in which the first signal is located.

In this embodiment, the value of q may be obtained according to the method provided above, or q may be obtained in another manner. This is not specifically limited in embodiments of the present disclosure. In addition, values of p corresponding to different subcarrier groups may be the same. For example, for the N subcarrier groups, values of p corresponding to at least two subcarrier groups may be the same. In an example, p may be equal to 31. In this case, a quantity of available sequences is 30, and a cell planning requirement can be met. This is not limited in embodiments of this application.

For example, $n_{id}$ may be irrelevant to frequency domain positions occupied by the N subcarriers. For example, the N subcarrier groups may belong to a subcarrier group set, the subcarrier group set further includes F subcarrier groups, and frequency domain positions of the F subcarrier groups are different from the frequency domain positions of the N subcarrier groups. If the first device also sends a signal by using the F subcarrier groups in a manner the same as that in S62, the F subcarrier groups also correspond to $n_{id}$. In this case, $n_{id}$ corresponding to the F subcarrier groups and $n_{id}$ corresponding to the N subcarrier groups may be the same or different. Specifically, whether $n_{id}$ corresponding to the F subcarrier groups and $n_{id}$ corresponding to the N subcarrier groups are the same or different is irrelevant to the frequency domain position of the subcarrier group. F is a positive integer.

In this embodiment, the value of q may be determined based on the identifier of the first signal or the cell identifier. For example, $q=\lfloor \bar{q}+\frac{1}{2} \rfloor$. In this case, cross-correlation between sequences obtained by intercepting the sequence $\{z_q(m)\}$ is relatively good. Therefore, for a subcarrier group, provided that the sequence $\{z_q(m)\}$ is intercepted, it can be ensured that cross-correlation between signals carried and sent in different cells in the subcarrier group is relatively good, thereby reducing interference between the cells, and improving channel estimation performance. For example, when p is equal to 31, $K_i$ is equal to 18, and $M_{zc}$ is 1193, a largest value of cross-correlation between sequences carried in every two subcarrier groups is 0.48212, and an average value is 0.40056. Correspondingly, in an NR system, sequences used are segments of the Gold sequence, a largest value of cross-correlation between the sequences is greater than 0.9, and an average value of the sequences is 0.48829. Therefore, by using this solution, the value of cross-correlation may be smaller, and interference between signals may be further reduced.

A part that is of the first signal and that is carried on the $k^{th}$ subcarrier in the $i^{th}$ subcarrier group in the N subcarrier groups is $x_{i,n_{id}}(k)$, where k=0, 1, 2, ..., $K_i$–1, $x_{i,n_{id}}(k)=z_q(d_i+k)$, and $d_i$ is a non-negative integer. When the quantity of carriers in each subcarrier group is K, if $d_i$ is a non-negative integer, it may also be understood that $d_i \square \{K, 2K, 3K, 4K, 5K, \ldots, LK\}$, where L is a non-negative integer.

For example, the first device may first determine the sequence $\{z_q(m)\}$, and then separately intercept a part of the sequence $\{z_q(m)\}$ as a part of the first signal in each of the N subcarrier groups. In this case, the second device first determines the long sequence, and then intercepts the long sequence, where the intercepted sequences each is used as a sequence carried in each of the N subcarrier groups. Alternatively, the first device may directly determine the sequence based on each of the N subcarrier groups. To be specific, the first device may directly determine the sequence carried in each of the N subcarrier groups. For example, the first device directly determines the sequence $\{x_{i,n_{id}}(k)\}$ n this case, the first device does not need to determine the long sequence, but directly determines the sequence carried in each subcarrier group. A specific determining manner of the first device is not limited in embodiments of this application.

For example, $d_i$ may be determined based on a frequency domain position of the $i^{th}$ subcarrier group. For example, the value of $d_i$ may be determined based on the position, in the system bandwidth or the BWP, of the subcarrier in the $i^{th}$ subcarrier group in which the first signal is located. In an example, $$d_i = \left\lfloor \frac{n_i}{n_{dist}} \right\rfloor + n_{offset},$$

where $n_i$ is a number of a smallest subcarrier in the $i^{th}$ subcarrier group; the $n_i$ herein is an absolute number, in the system bandwidth or in the BWP, of the smallest subcarrier in the $i^{th}$ subcarrier group, but is not a relative number in the $i^{th}$ subcarrier group or in the N subcarrier groups; $n_{dist}$ is a spacing between subcarriers in the subcarrier group; $n_{dist}$ is a positive integer; and $n_{offset}$ is an integer.

The part that is of the first signal and that is carried in the $i^{th}$ subcarrier group in the N subcarrier groups is the first segment of the sequence. For example, the first segment in the sequence may be determined based on the frequency domain position of the $i^{th}$ subcarrier group. In other words, a specific segment of the sequence carried in each of the N subcarrier groups may be related to a frequency domain position of each subcarrier group, so that it can be ensured that the N subcarrier groups can carry a relatively complete sequence. In this embodiment, each of the N subcarrier groups may carry a part of the first signal, and parts carried by each subcarrier group are segments of the sequence. In addition, segments carried in at least two of the N subcarrier groups are different. For example, the at least two subcarrier groups separately carry different parts of the first signal. For example, the at least two subcarrier groups are the N subcarrier groups. In other words, signals carried in the N subcarrier groups are different. For example, the first device sends the first signal by using the N subcarrier groups, where the N subcarrier groups separately carry different parts of the first signal. In this way, the complete first signal can be sent by using the N subcarrier groups. Alternatively, the at least two subcarrier groups are only a proper subset of the N subcarrier groups. In this case, in addition to the at least two subcarrier groups, the N subcarrier groups further include other subcarrier groups. Signals carried in the other subcarrier groups may be the same. For example, the first device sends the first signal by using the N subcarrier groups, and the first signal includes a same part. Therefore, the at least two subcarrier groups may carry different parts of the first signal, the other subcarrier groups different from the at least two subcarrier groups in the N subcarrier groups may carry the same part of the first signal, so that the complete first signal can be sent by using the N subcarrier groups. Alternatively, the first device sends the first signal by using the N subcarrier groups. The first signal can be carried by using the at least two subcarrier groups, and an error-prone part or a relatively important part of the first signal can be carried by using other subcarrier groups different from the at least two subcarrier groups in the N subcarrier groups. In this case, the error-prone part or the relatively important part in the first signal may be transmitted for a plurality of times, thereby improving transmission reliability.

To send the first signal on the N subcarrier groups, the first device first needs to generate the first signal. In an optional manner of generating the first signal, a process of generating the first signal is specifically as follows: The first device maps segments in the sequence $\{z_q(m)\}$ to the N subcarrier groups, to generate the first signal, and sends the first signal to the network device. For a specific generation manner, refer to the descriptions in the foregoing embodiment. A generation method is the same, and a difference lies in a used signal.

Optionally, the $i^{th}$ subcarrier group is used as an example. For a specific process in which the first device separately maps the sequence $\{x_{i,n_{id}}(k)\}$ including the $K_i$ elements to the $K_i$ subcarriers to obtain the part of the first signal, refer to the descriptions of the embodiment shown in FIG. 3.

For example, the first device may send, on one OFDM symbol, the first signal that carries a sequence $\{x(n)\}$. Alternatively, the first signal that carries the sequence $\{z_q(m)\}$ may be sent on a plurality of OFDM symbols.

In an optional manner, the first signal may be a DMRS, an SRS, control information, or the like. The first signal in this embodiment includes but is not limited to only the foregoing information.

In another optional manner, the first signal is a signal used to carry communication information. During specific implementation, the communication information may be carried in a sequence selection manner, or may be carried in a sequence modulation manner, but is not limited thereto. The communication information includes, for example, data and/or control information.

For example, the first device is a terminal device. For example, the sequence selection manner is: allocating $2^n$ orthogonal sequences to one terminal device. For the $2^n$ orthogonal sequences, refer to the foregoing descriptions.

For an example of the sequence modulation manner, refer to the foregoing descriptions.

In an example, as described above, the first device may determine the sequence $\{z_q(m)\}$ based on A and $$\exp(j\alpha t)\exp\left(-\frac{j\pi qt(t+1)}{M_{zc}}\right).$$

It should be noted that for the sequence modulation manner, different information may be carried by using different values of A in the sequence $\{z_q(m)\}$.

For a same parameter in this embodiment, refer to the foregoing descriptions.

The second device may receive a signal on the N subcarriers based on predefined or configured positions of the N subcarriers in subcarriers in the communication system.

For example, the second device may obtain the first signal on the N subcarriers on N consecutive subcarriers, or obtain the first signal on the N subcarriers on N evenly spaced subcarriers.

S63: The second device obtains the sequence carried by the first signal.

The sequence carried by the first signal is, for example, the sequence $\{z_q(m)\}$, or may be a part of the sequence $\{z_q(m)\}$. The part that is of the first signal and that is carried in the $i^{th}$ subcarrier group in the N subcarrier groups is the first segment of the sequence. The $i^{th}$ subcarrier group is used as an example. The second device may obtain the $K_i$ elements in the sequence $\{x_{i,n_{id}}(k)\}$ carried by the first signal.

Descriptions of $\{z_q(m)\}$, the sequence $\{x_{i,n_{id}}(k)\}$, related elements, and the like are relatively described in detail in S62.

For example, the second device may obtain a signal on the $K_i$ subcarriers on $K_i$ consecutive subcarriers, or obtain a signal on the $K_i$ subcarriers on $K_i$ evenly spaced subcarriers, and remove a cyclic prefix of the obtained signal to obtain a time domain signal, to obtain a frequency domain signal including the $K_i$ elements, and then determine the $K_i$ elements in the sequence $\{x_{i,n_{id}}(k)\}$ based on the frequency domain signal including the $K_i$ elements. For each of the N subcarrier groups, the terminal device may obtain, in this manner, $K_i$ elements in a sequence carried in a corresponding subcarrier group.

S64: The second device processes, based on the $K_i$ elements in the sequence $\{x_{i,n_{id}}(k)\}$, the part that is of the first signal and that is carried in the $i^{th}$ subcarrier group in the N subcarrier groups.

Figure 2:
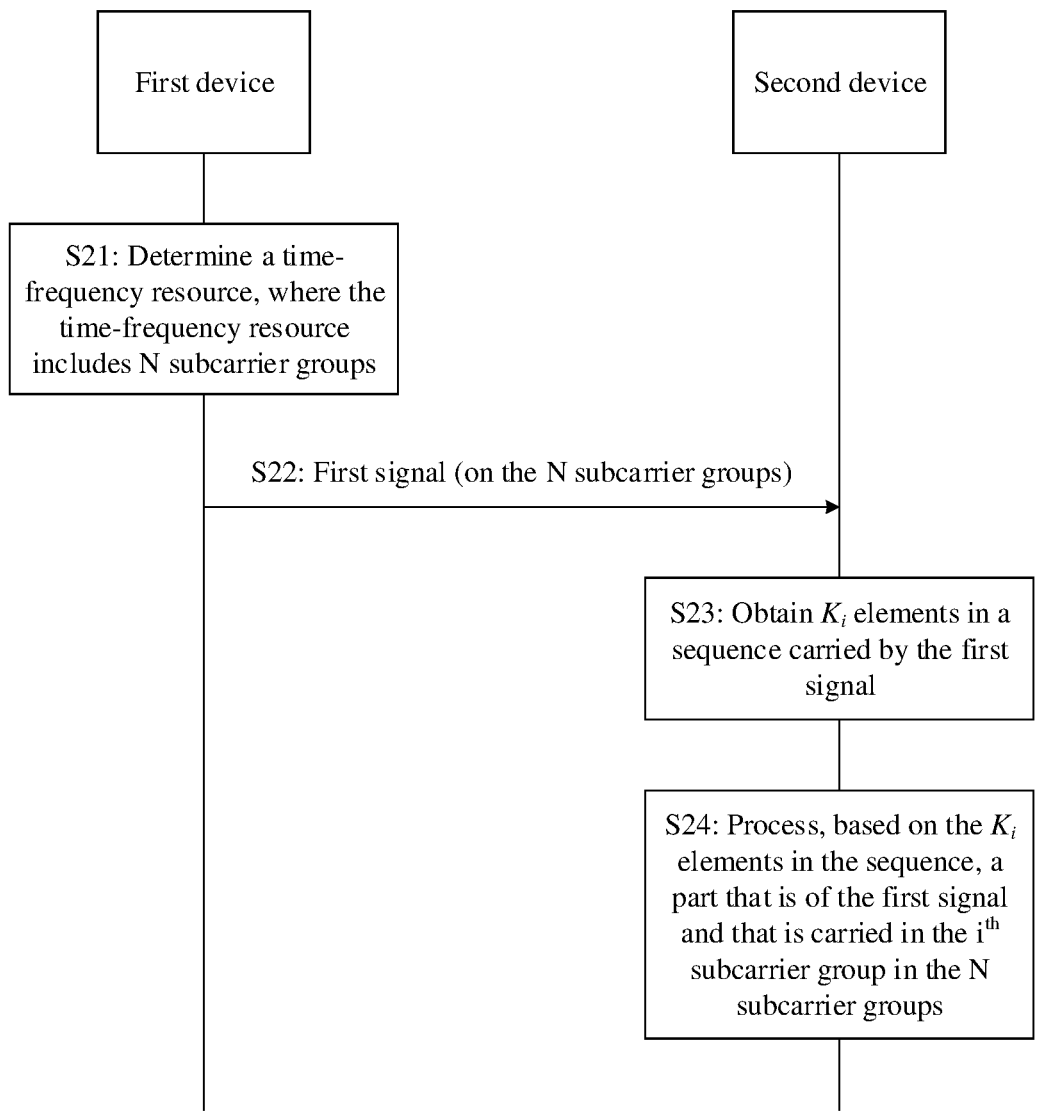
FIG. 2 is a flowchart of a first signal sending and receiving method according to an embodiment of this application.

Optionally, for a process in which the second device processes the part that is of the first signal and that is carried in the $i^{th}$ subcarrier group in the N subcarrier groups, refer to FIG. provided in the embodiment shown in FIG. 2. The second device separately performs correlation processing on the obtained sequence $\{y(k)\}$ and all possible sequences $\{x'(k)\}$, and performs maximum likelihood comparison, to obtain the data transmitted by the first device. The sequence $\{y(k)\}$ is obtained by the second device based on a received signal carried in the $i^{th}$ subcarrier group. Still referring to FIG. 5B provided in the embodiment shown in FIG. 2, the second device removes a cyclic prefix from the received signal carried in the $i^{th}$ subcarrier group, and then performs processing such as fast Fourier transformation (FFT) and demapping, to obtain the sequence $\{y(k)\}$. $\{x'(k)\}$ is a local sequence generated by $\{x(k)\}$. With reference to the foregoing descriptions, for example, for two-bit information, a value combination is $\{(0,0), (0,1), (1,0), (1,1)\}$. For example, when the two-bit information is (0,0), the obtained sequence x'(k) is a sequence $x'_1(k)$; when the two-bit information is (0,1), the obtained sequence x'(k) is a sequence $x'_2(k)$; when the two-bit information is (1,0), the obtained sequence x'(k) is a sequence $x'_3(k)$; and when the two-bit information is (1,1), the obtained sequence x'(k) is a sequence $x'_4(k)$. The four sequences $x'_1(k)$, $x'_2(k)$, $x'_3(k)$, and $x'_4(k)$ may be cyclic shift sequences of a same sequence, and the sequence $\{y(k)\}$ is separately correlated to $x'_1(k)$, $x'_2(k)$, $x'_3(k)$, and $x'_4(k)$ to obtain four correlation values. A value of the two-bit information corresponding to a largest correlation value is the data obtained by the second device. For example, if the largest correlation value is obtained by correlating the sequence $\{y(k)\}$ with $x'_1(k)$, the second device determines that the two-bit information transmitted by the first device is (0,0).

The second device may perform similar processing on a signal carried in each of the N subcarrier groups, to obtain the first signal.

Processing the first signal by the second device may be separately processing each subcarrier group, or may be processing the entire first signal. In the foregoing description process, the separately processing each subcarrier group is mainly used as an example. In addition, the processing of the first signal by the second device may be related to a local sequence, or may be channel estimation performed based on the received signal and the local sequence. This is not specifically limited.

In this embodiment, the part $\{x_{i,n_{id}}(k)\}$ that is of the first signal and that is carried in the subcarrier group in the N subcarrier groups is the segment of the sequence $\{z_q(m)\}$, q meets the condition, and when the sequence $\{z_q(m)\}$ meets different values of q, cross-correlation between segments in the sequence is relatively good. Therefore, for two subcarrier groups, provided that selected q meets the condition, it can be ensured that cross-correlation between signals carried in the two subcarrier groups is relatively good, thereby reducing interference between the signals and improving channel estimation performance.

In this embodiment, the part that is of the first signal and that is carried on the $k^{th}$ subcarrier in the $i^{th}$ subcarrier group in the N subcarrier groups is the segment of $\{z_q(m)\}$. When q meets the condition in this embodiment, when terminal devices in different cells in a system send signals on a same time-frequency resource according to the foregoing rule, for a same time domain resource used by different terminal devices and a same subcarrier group, provided that sequences of the different terminal devices are obtained based on a ZC sequence with different values of q, it can be ensured that when the terminal devices in the different cells send signals in a same subcarrier group, cross-correlation between the signals carried in the subcarrier group is relatively good, thereby reducing interference between the signals in the cells and improving channel estimation performance of access network devices in the different cells. The first signal in the embodiments of this application may alternatively be a downlink signal. According to the downlink signal sent by using the method in the foregoing embodiment, the cross-correlation between the signals carried in the same subcarrier group can also be relatively good, thereby reducing the interference between the signals in the cells and improving the channel estimation performance of the terminal devices in the different cells.

The following describes, with reference to the accompanying drawings, apparatuses configured to implement the foregoing method in the embodiments of this application.

Therefore, all the foregoing content may be used in subsequent embodiments, and duplicated content is not described again.

Figure 7:
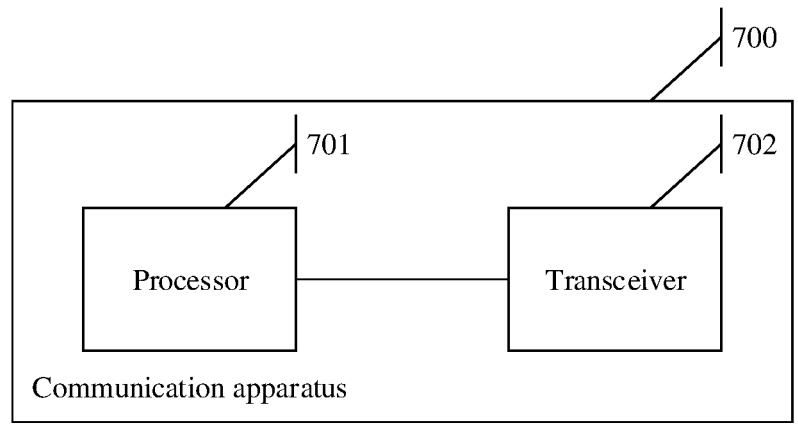
FIG. 7 is a schematic structural diagram of a communication apparatus that can implement a function of a first device according to an embodiment of this application.
Figure 8:
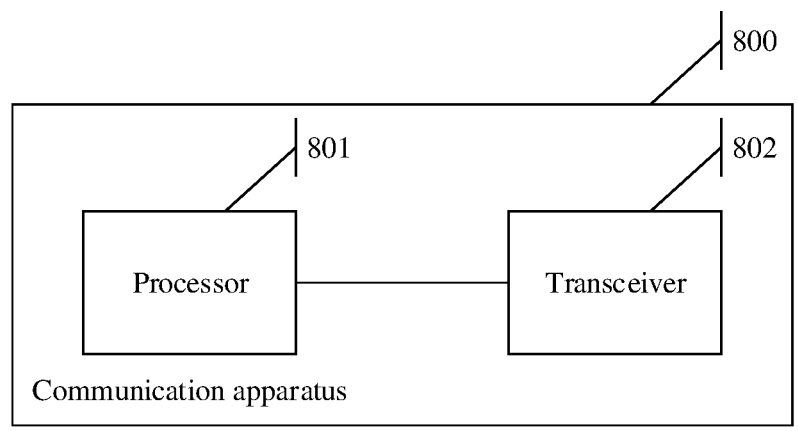
FIG. 8 is a schematic structural diagram of a communication apparatus that can implement a function of a second device according to an embodiment of this application.

FIG. 7 is a schematic structural diagram of a communication apparatus 700. The communication apparatus 700 may implement functions of the first device described above. The communication apparatus 700 may be the first device described above. For example, the communication apparatus 1100 is the network device 102 shown in FIG. 1A, or the access network device 102 shown in FIG. 1B. Alternatively, the communication apparatus 1100 may be the terminal device shown in FIG. 1A or FIG. 1C, or may be a chip disposed in the first device described above. The communication apparatus 700 may include a processor 701 and a transceiver 702. If the first device shown in FIG. 8 is the access network device 102 shown in FIG. 1B, the processor 701 and the controller/processor 201 may be a same component, and the transceiver 702 and the transceiver 202 may be a same component. Alternatively, if the first device shown in FIG. 8 is the terminal device shown in FIG. 1A or FIG. 1C, the processor 801 and the application processor 302 may be a same component, and the transceiver 1102 and the transceiver 301 may be a same component. The processor 701 may be configured to perform S21 in the embodiment shown in FIG. 2, and/or configured to support another process of the technology described in this specification. The transceiver 702 may be configured to perform S22 in the embodiment shown in FIG. 2, and/or configured to support another process of the technology described in this specification.

For example, the processor 701 is configured to determine a time-frequency resource, where the time-frequency resource includes N subcarrier groups, the $i^{th}$ subcarrier group in the N subcarrier groups includes $K_i$ subcarriers, N is a positive integer greater than or equal to 1, and $K_i$ is an integer greater than 1.

The transceiver 702 is configured to send a first signal on the N subcarrier groups, where a part that is of the first signal and that is carried on the $k^{th}$ subcarrier in the $i^{th}$ subcarrier group in the N subcarrier groups is $x_{i,n_{id}}(k)$, where k=0, 1, 2, . . . , $K_i$−1, $x_{i,n_{id}}(k)=A \cdot c_i(k) \cdot b_{i,n_{id}}$, $c_i(k)=\mu \cdot \exp(\pi \cdot j \cdot s_{i,n_{id}}(k)/4) \cdot \exp(\alpha_{i,n_{id}} 2\pi k j/K_i) d_i(k)$, A and $\mu$ are both non-zero complex constants, $j=\sqrt{-1}$, $j=\sqrt{-1}$, $n_{id}$ is an identifier of the first signal or a cell identifier, and $\alpha_{i,n_{id}}$ is a real number. For the sequence $\{s_{i,n_{id}}(k)\}$, refer to the foregoing descriptions.

All related content of the steps in the foregoing method embodiments may be cited in function descriptions of corresponding functional modules.

FIG. 8 is a schematic structural diagram of a communication apparatus 800. The communication apparatus 800 may implement functions of the second device described above. The communication apparatus 800 may be the second device described above. For example, the communication apparatus 800 is the network device 102 shown in FIG. 1A, or the access network device 102 shown in FIG. 1B. Alternatively, the communication apparatus 800 may be the terminal device shown in FIG. 1A or FIG. 1C, or may be a chip disposed in the second device described above. The communication apparatus 800 may include a processor 801 and a transceiver 802. If the first device shown in FIG. 8 is the terminal device shown in FIG. 1A or FIG. 1C, the second device shown in FIG. 8 may be the access network device 102 shown in FIG. 1B, the processor 801 and the controller/processor 201 may be a same component, and the transceiver 802 and the transceiver 202 may be a same component. Alternatively, if the first device shown in FIG. 7 is the access network device 102 shown in FIG. 1B, the second device shown in FIG. 8 may be the terminal device shown in FIG. 1A or FIG. 1C, the processor 801 and the application processor 302 may be a same component, and the transceiver 802 and the transceiver 301 may be a same component. The processor 801 may be configured to perform S23 and S24 in the embodiment shown in FIG. 2, and/or configured to support another process of the technology described in this specification. The transceiver 802 may be configured to perform S22 in the embodiment shown in FIG. 2, and/or configured to support another process of the technology described in this specification.

For example, the transceiver 802 is configured to: receive a first signal carried on N subcarriers, and obtain $K_i$ elements in a sequence $\{x_{i,n_{id}}(k)\}$ carried in the $i^{th}$ subcarrier group in the N subcarrier groups, where k=0, 1, 2, . . . , $K_i$−1, $x_{i,n_{id}}(k)=A \cdot c_i(k) \cdot b_{i,n_{id}}$, $c_i(k)=\mu \cdot \exp(\pi \cdot j \cdot s_{i,n_{id}}(k)/4) \cdot \exp(\alpha_{i,n_{id}} 2\pi k j/K_i) d_i(k)$, A and $\mu$ are both non-zero complex constants, $j=\sqrt{-1}$, $n_{id}$ is an identifier of the first signal or a cell identifier, and $\alpha_{i,n_{id}}$ is a real number.

The processor 801 is configured to process, based on the $K_i$ elements in the sequence $\{x_{i,n_{id}}(k)\}$, a signal carried in the $i^{th}$ subcarrier group in the N subcarrier groups. For the sequence $\{s_{i,n_{id}}(k)\}$, refer to the foregoing descriptions.

All related content of the steps in the foregoing method embodiments may be cited in function descriptions of corresponding functional modules.

Figure 9:
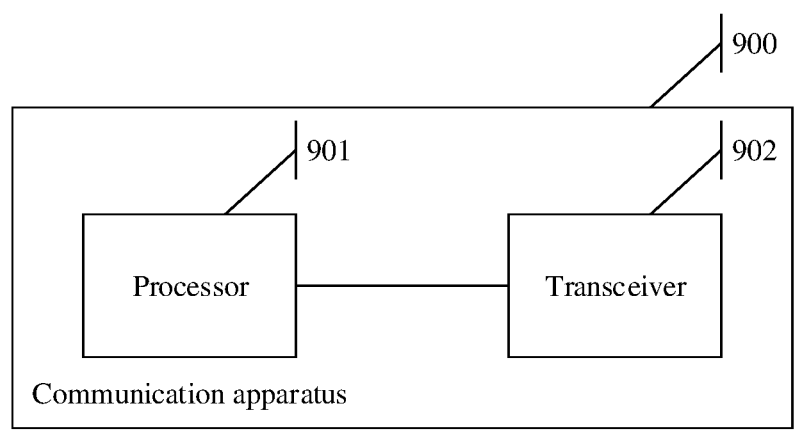
FIG. 9 is a schematic structural diagram of a communication apparatus that can implement a function of a first device according to an embodiment of this application.

FIG. 9 is a schematic structural diagram of a communication apparatus 900. The communication apparatus 900 may implement functions of the first device described above. The communication apparatus 900 may be the first device described above. For example, the communication apparatus 900 is the network device 102 shown in FIG. 1A, or the access network device 102 shown in FIG. 1B. Alternatively, the communication apparatus 900 may be the terminal device shown in FIG. 1A or FIG. 1C, or may be a chip disposed in the first device described above. The communication apparatus 900 may include a processor 901 and a transceiver 902. If the first device shown in FIG. 9 is the access network device 102 shown in FIG. 1B, the processor 901 and the controller/processor 201 may be a same component, and the transceiver 902 and the transceiver 202 may be a same component. Alternatively, if the first device shown in FIG. 9 is the terminal device shown in FIG. 1A or FIG. 1C, the processor 901 and the application processor 302 may be a same component, and the transceiver 902 and the transceiver 301 may be a same component. The processor 901 may be configured to perform S61 in the embodiment shown in FIG. 6, and/or configured to support another process of the technology described in this specification. The transceiver 902 may be configured to perform S62 in the embodiment shown in FIG. 6, and/or configured to support another process of the technology described in this specification.

For example, the processor 901 is configured to determine a time-frequency resource, where the time-frequency resource includes N subcarrier groups, the $i^{th}$ subcarrier group in the N subcarrier groups includes $K_i$ subcarriers, the $K_i$ subcarriers are evenly spaced, N is a positive integer greater than or equal to 1, and $K_i$ is an integer greater than 1.

The transceiver 902 is configured to send a first signal on the N subcarrier groups, where a part that is of the first signal and that is carried in the $i^{th}$ subcarrier group in the N subcarrier groups is a first segment of a sequence $\{z_q(m)\}$; a length of the sequence $\{z_q(m)\}$ is M; the sequence meets $z_q(m)=y_q(m \bmod M_{zc})$, where m=0, 1, 2, . . . , M−1, M is an integer greater than 1, $M_{zc}$ is a maximum prime number that meets $M_{zc}<M$, or $M_{zc}$ is a minimum prime number that meets $M_{zc}>M$; and $$K_i < \frac{M_{ZC}}{2}, y_q(t) = A \cdot \exp(j\alpha t)\exp\left(-\frac{j\pi qt(t+1)}{M_{zc}}\right),$$

where A is a non-zero complex constant, t=0, 1, 2, . . . , $M_{zc}-1$, $j=\sqrt{-1}$, $\alpha$ is a real number, q is determined based on an identifier of the first signal or a cell identifier, and $q=\lfloor \bar{q}+\frac{1}{2} \rfloor$, where $\bar{q}=M_{zc}\cdot(n_{id}+1)/p$, $n_{id} \in \{0, 1, 2, \ldots, p-2\}$, p is a prime number greater than 2, and $n_{id}$ is determined based on the identifier of the first signal or the cell identifier.

All related content of the steps in the foregoing method embodiments may be cited in function descriptions of corresponding functional modules.

Figure 10:
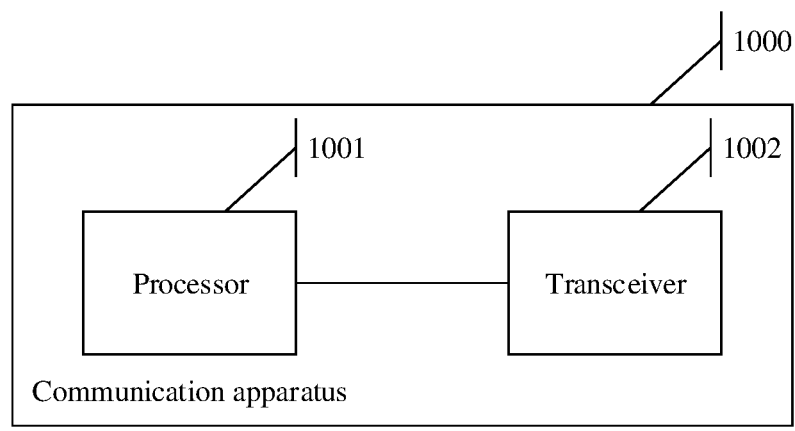
FIG. 10 is a schematic structural diagram of a communication apparatus that can implement a function of a second device according to an embodiment of this application.

FIG. 10 is a schematic structural diagram of a communication apparatus 1000. The communication apparatus 1000 may implement functions of the second device described above. The communication apparatus 1000 may be the second device described above. For example, the communication apparatus 1100 is the network device 102 shown in FIG. 1A, or the access network device 102 shown in FIG. 1B. Alternatively, the communication apparatus 1000 may be the terminal device shown in FIG. 1A or FIG. 1C, or may be a chip disposed in the second device described above. The communication apparatus 1000 may include a processor 1001 and a transceiver 1002. If the first device shown in FIG. 10 is the terminal device shown in FIG. 1A or FIG. 1C, the second device shown in FIG. 10 may be the access network device 102 shown in FIG. 1B, the processor 1001 and the controller/processor 201 may be a same component, and the transceiver 1002 and the transceiver 202 may be a same component. Alternatively, if the first device shown in FIG. 9 is the access network device 102 shown in FIG. 1B, the second device shown in FIG. 10 may be the terminal device shown in FIG. 1A or FIG. 1C, the processor 1001 and the application processor 302 may be a same component, and the transceiver 1002 and the transceiver 301 may be a same component. The processor 1001 may be configured to perform S63 and S64 in the embodiment shown in FIG. 6, and/or configured to support another process of the technology described in this specification. The transceiver 1002 may be configured to perform S62 in the embodiment shown in FIG. 6, and/or configured to support another process of the technology described in this specification.

For example, the transceiver 1002 is configured to: receive a first signal carried on N subcarriers, and obtain a sequence that is carried by the first signal and that is in the $i^{th}$ subcarrier group in the N subcarrier groups, where the sequence is a first segment of a sequence $\{z_q(m)\}$; a length of the sequence $\{z_q(m)\}$ is M; the sequence meets $z_q(m)=y_q(m \bmod M_{zc})$, where m=0, 1, 2, . . . , M−1, M is an integer greater than 1, $M_{zc}$ is a maximum prime number that meets $M_{zc}<M$, or $M_{zc}$ is a minimum prime number that meets $M_{zc}>M$; and $$K_i < \frac{M_{zc}}{2}, y_q(t) = A\exp(j\alpha t)\exp\left(-\frac{j\pi qt(t+1)}{M_{zc}}\right),$$

where A is a non-zero complex constant, t=0, 1, 2, . . . , $M_{zc}-1$, j is a unit of imaginary numbers, $j=\sqrt{-1}$, $\alpha$ is a real number, q is determined based on an identifier of the first signal or a cell identifier, and $q=\lfloor \bar{q}+\frac{1}{2} \rfloor$, where $\bar{q}=M_{zc}\cdot(n_{id}+1)/p$, $n_{id} \in \{0, 1, 2, \ldots, p-2\}$, p is a prime number greater than 2, and $n_{id}$ is determined based on the identifier of the first signal or the cell identifier.

The processor 1001 is configured to process the first signal.

All related content of the steps in the foregoing method embodiments may be cited in function descriptions of corresponding functional modules.

Figure 11:
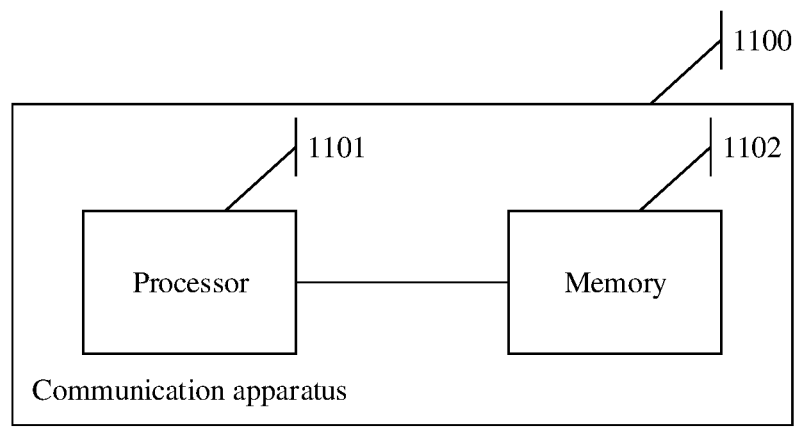
FIG. 11 is a schematic structural diagram of a communication apparatus according to an embodiment of this application.

In a simple embodiment, a person of ordinary skill in the art may determine that the communication apparatus 700, the communication apparatus 800, the communication apparatus 900, or the communication apparatus 1000 may further be implemented by using a structure of a communication apparatus 1100 shown in FIG. 11. The communication apparatus 1100 may implement functions of the first device or the second device described above. The communication apparatus 1100 may include a processor 1101. Optionally, the communication apparatus 1100 may further include a memory 1102, and may be configured to store instructions required by the processor 1101 to execute a task.

When the communication apparatus 1100 is configured to implement the functions of the first device described above, the processor 1101 may be configured to perform S21 in the embodiment shown in FIG. 2, and/or configured to support another process of the technology described in this specification. Alternatively, when the communication apparatus 1100 is configured to implement the functions of the second device described above, the processor 1101 may be configured to perform S23 and S24 in the embodiment shown in FIG. 2, and/or configured to support another process of the technology described in this specification. Alternatively, when the communication apparatus 1100 is configured to implement the functions of the first device described above, the processor 1101 may be configured to perform S61 in the embodiment shown in FIG. 6, and/or configured to support another process of the technology described in this specification. Alternatively, when the communication apparatus 1100 is configured to implement the functions of the second device described above, the processor 1101 may be configured to perform S63 and S64 in the embodiment shown in FIG. 6, and/or configured to support another process of the technology described in this specification.

The communication apparatus 1100 may be implemented by using a field programmable gate array (fFPGA), an application-specific integrated circuit (ASIC), a system on chip (SoC), a central processing unit (CPU), a network processor (NP), a digital signal processing circuit (DSP), a micro controller unit (MCU), a programmable controller (PLD), or another integrated chip. The communication apparatus 1100 may be disposed in the first device or the second device in the embodiments of this application, so that the first device or the second device implements the method provided in the embodiments of this application.

In an optional implementation, the communication apparatus 1100 may include a transceiver component, configured to communicate with another device. When the communication apparatus 1100 is configured to implement the functions of the first device or the second device described above, the transceiver component may be configured to perform S22 in the embodiment shown in FIG. 2, and/or configured to support another process of the technology described in this specification. Alternatively, when the communication apparatus 1100 is configured to implement the functions of the first device or the second device described above, the transceiver component may be configured to perform S62 in the embodiment shown in FIG. 6, and/or configured to support another process of the technology described in this specification.

In addition, the communication apparatus 700 provided in the embodiment shown in FIG. 7 may alternatively be implemented in another form. For example, the communication apparatus includes a processing module and a transceiver module. For example, the processing module may be implemented by the processor 701, and the transceiver module may be implemented by the transceiver 702. The processing module may be configured to perform S21 in the embodiment shown in FIG. 2, and/or configured to support another process of the technology described in this specification. The transceiver module may be configured to perform S22 in the embodiment shown in FIG. 2, and/or configured to support another process of the technology described in this specification. The communication apparatus 800 provided in the embodiment shown in FIG. 8 may alternatively be implemented in another form. For example, the communication apparatus includes a processing module and a transceiver module. For example, the processing module may be implemented by the processor 801, and the transceiver module may be implemented by the transceiver 802. The processing module may be configured to perform S23 and S24 in the embodiment shown in FIG. 2, and/or configured to support another process of the technology described in this specification. The transceiver module may be configured to perform S22 in the embodiment shown in FIG. 2, and/or configured to support another process of the technology described in this specification. The communication apparatus 900 provided in the embodiment shown in FIG. 9 may alternatively be implemented in another form. For example, the communication apparatus includes a processing module and a transceiver module. For example, the processing module may be implemented by the processor 901, and the transceiver module may be implemented by the transceiver 902. The processing module may be configured to perform S61 in the embodiment shown in FIG. 6, and/or configured to support another process of the technology described in this specification. The transceiver module may be configured to perform S62 in the embodiment shown in FIG. 6, and/or configured to support another process of the technology described in this specification. The communication apparatus 1000 provided in the embodiment shown in FIG. 10 may alternatively be implemented in another form. For example, the communication apparatus includes a processing module and a transceiver module. For example, the processing module may be implemented by the processor 1001, and the transceiver module may be implemented by the transceiver 1002. The processing module may be configured to perform S63 and S64 in the embodiment shown in FIG. 6, and/or configured to support another process of the technology described in this specification. The transceiver module may be configured to perform S62 in the embodiment shown in FIG. 6, and/or configured to support another process of the technology described in this specification.

An embodiment of this application further provides an apparatus (for example, an integrated circuit, a wireless device, and a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include a memory IC configured to store data and/or instructions, (iii) an RFIC such as an RF receiver or an RF transmitter/receiver, (iv) an ASIC such as a mobile station modem, (v) a module that can be embedded in another device, (vi) a receiver, a cellular phone, a wireless device, a hand-held phone, or a mobile unit, or (vii) others.

The method and apparatus that are provided in the embodiments of this application may be applied to the terminal device or the access network device (which may be collectively referred to as a wireless device). The terminal device, the access network device, or the wireless device may include a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a windows operating system. The application layer includes applications such as a browser, an address book, word processing software, and instant communication software. In addition, in the embodiments of this application, a specific structure of an execution body of the method is not limited in the embodiments of this application, provided that a program that records code of the method in the embodiments of this application can be run to perform communication according to the signal transmission method in the embodiments of this application. For example, the wireless communication method in the embodiments of this application may be performed by a terminal device or an access network device, or may be performed by a functional module that can invoke a program and execute the program in the terminal device or the access network device.

A person of ordinary skill in the art may be aware that, units and algorithm steps in examples described with reference to the embodiments disclosed in this specification can be implemented by electronic hardware or a combination of computer software and electronic hardware. Whether the functions are performed by using hardware or software depends on particular applications and design constraints of the technical solutions. A person of ordinary skill in the art may use different methods to implement the described functions for each particular application, but it should not be considered that the implementation goes beyond the scope of the embodiments of this application.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The "machine-readable media" may include but is not limited to a radio channel, and various other media that can store, include, and/or carry instructions and/or data.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by a person of ordinary skill in the art that, for the purpose of convenient and brief description, for a detailed working process of the foregoing system, apparatus, or unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

When the functions are implemented in a form of a software functional unit and sold or used as an independent product, the functions may be stored in a computer-readable storage medium. Based on such an understanding, the technical solutions of the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely non-limiting examples of specific implementations, and are not intended to limit the protection scope, which is intended to cover any variation or replacement readily determined by a person of ordinary skill in the art. Therefore, the claims shall define the protection scope.

What is claimed is:

1. A signal sending method, comprising:
determining a time-frequency resource, wherein the time-frequency resource comprises N subcarrier groups, an $i^{th}$ subcarrier group in the N subcarrier groups comprises $K_i$ subcarriers, the $K_i$ subcarriers are evenly spaced, N is a positive integer greater than or equal to 1, and $K_i$ is an integer greater than 1; and
sending a first signal on the N subcarrier groups, wherein a part that is of the first signal and that is carried in the $i^{th}$ subcarrier group in the N subcarrier groups is a first segment of a sequence $\{z_q(m)\}$; a length of the sequence $\{z_q(m)\}$ is M; the sequence meets $z_q(m)=y_q(m \bmod M_{zc})$, wherein m=0, 1, 2, ..., M−1, M is an integer greater than 1, $M_{zc}$ is a maximum prime number that is less than M or a minimum prime number that is larger than M; and $$K_i < \frac{Mzc}{2}, y_q(t) = A \cdot \exp(j\alpha t)\exp\left(-\frac{j\pi qt(t+1)}{M_{zc}}\right),$$

wherein A is a non-zero complex constant, t=0, 1, 2, ..., $M_{zc}$−1, j=$\sqrt{-1}$, $\alpha$ is a real number, q is determined based on an identifier of the first signal or a cell identifier, and $q=\lfloor \bar{q}+\frac{1}{2} \rfloor$, wherein $\bar{q}=M_{zc}\cdot(n_{id}+1)/p$, $n_{id} \in \{0, 1, 2, ..., p-2\}$, p is a prime number greater than 2, and $n_{id}$ is determined based on the identifier of the first signal or the cell identifier.

2. The method according to claim 1, further comprising:
determining the first segment in the sequence based on a frequency domain position of the $i^{th}$ subcarrier group.

3. The method according to claim 1, wherein each of the N subcarrier groups carries a part of the first signal, the part of the first signal carried in each subcarrier group is a segment of the sequence, and segments carried in at least two of the N subcarrier groups are different.

4. The method according to claim 1, wherein a value of q is determined based on the cell identifier or a sequence group identifier.

5. The method according to claim 1, wherein the first signal is a demodulation reference signal (DMRS), a sounding reference signal (SRS), or control information.

6. A signal receiving method, comprising:
receiving a first signal carried on N subcarrier groups, and obtaining a sequence that is carried by the first signal and that is in an $i^{th}$ subcarrier group in the N subcarrier groups, wherein N is a positive integer greater than or equal to 1, the sequence is a first segment of a sequence $\{z_q(m)\}$; a length of the sequence $\{z_q(m)\}$ is M; the sequence meets $z_q(m)=y_q(m \bmod M_{zc})$, wherein m=0, 1, 2, ..., M−1, M is an integer greater than 1, $M_{zc}$ is a maximum prime number that is less than M or a minimum prime number that is larger than M; and $$K_i < \frac{Mzc}{2}, y_q(t) = A \cdot \exp(j\alpha t)\exp\left(-\frac{j\pi qt(t+1)}{M_{zc}}\right),$$

wherein A is a non-zero complex constant, t=0, 1, 2, ..., $M_{zc}-1$, $j=\sqrt{-1}$, α is a real number, q is determined based on an identifier of the first signal or a cell identifier, and $q=\lfloor \bar{q}+\frac{1}{2} \rfloor$, wherein $\bar{q}=M_{zc} \cdot (n_{id}+1)/p$, $n_{id} \in \{0, 1, 2, \ldots, p-2\}$, p is a prime number greater than 2, and $n_{id}$ is determined based on the identifier of the first signal or the cell identifier; and
    processing the first signal.

7. The method according to claim 6, wherein a part that is of the first signal and that is carried on the $k^{th}$ subcarrier in the $i^{th}$ subcarrier group in the N subcarrier groups is $x_{i,n_{id}}(k)$, wherein k=0, 1, 2, ..., $K_i-1$, $x_{i,n_{id}}(k)=z_q(d_i+k)$, and $d_i$ is a non-negative integer.

8. The method according to claim 7, wherein a value of M is determined based on a maximum system bandwidth or a bandwidth part, and a value of $d_i$ is determined based on a position, in the system bandwidth or the bandwidth part, of a subcarrier in the $i^{th}$ subcarrier group in which the first signal is located.

9. The method according to claim 7, wherein the N subcarrier groups belong to a subcarrier group set, the subcarrier group set further comprises F subcarrier groups, frequency domain positions of the F subcarrier groups are different from frequency domain positions of the N subcarrier groups, $n_{id}$ corresponding to the F subcarrier groups is the same as $n_{id}$ corresponding to the N subcarrier groups, and F is a positive integer.

10. The method according to claim 7, wherein $$d_i = \left\lfloor \frac{n_i}{n_{dist}} \right\rfloor + n_{offset}, n_i$$

is a number of a smallest subcarrier in the $i^{th}$ subcarrier group, $n_{dist}$ is a spacing between subcarriers in the subcarrier group and is a positive integer, and $n_{offset}$ is an integer.

11. A communication apparatus, comprising at least one processor and a transceiver, wherein the at least one processor is coupled to the transceiver;
    the at least one processor is configured to determine a time-frequency resource, wherein the time-frequency resource comprises N subcarrier groups, an $i^{th}$ subcarrier group in the N subcarrier groups comprises $K_i$ subcarriers, the $K_i$ subcarriers are evenly spaced, N is a positive integer greater than or equal to 1, and $K_i$ is an integer greater than 1; and
    the transceiver is configured to send a first signal on the N subcarrier groups, wherein a part that is of the first signal and that is carried in the $i^{th}$ subcarrier group in the N subcarrier groups is a first segment of a sequence $\{z_q(m)\}$; a length of the sequence $\{z_q(m)\}$ is M; the sequence meets $z_q(m)=y_q(m \bmod M_{zc})$, wherein m=0, 1, 2, ..., M−1, M is an integer greater than 1, $M_{zc}$ is a maximum prime number that is less than M or a minimum prime number that is larger than M; and $$K_i < \frac{M_{ZC}}{2}, y_q(t) = A \cdot \exp(j\alpha t)\exp\left(-\frac{j\pi qt(t+1)}{M_{zc}}\right),$$

wherein A is a non-zero complex constant, t=0, 1, 2, ..., $M_{zc}-1$, $j=\sqrt{-1}$, α is a real number, q is determined based on an identifier of the first signal or a cell identifier, and $q=\lfloor \bar{q}+\frac{1}{2} \rfloor$, wherein $\bar{q}=M_{zc} \cdot (n_{id}+1)/p$, $n_{id} \in \{0, 1, 2, \ldots, p-2\}$, p is a prime number greater than 2, and $n_{id}$ is determined based on the identifier of the first signal or the cell identifier.

12. The communication apparatus according to claim 11, wherein the at least one processor is further configured to determine the first segment in the sequence based on a frequency domain position of the $i^{th}$ subcarrier group.

13. The communication apparatus according to claim 11, wherein each of the N subcarrier groups carries a part of the first signal, the part of the first signal carried in each subcarrier group is a segment of the sequence, and segments carried in at least two of the N subcarrier groups are different.

14. The communication apparatus according to claim 11, wherein a value of q is determined based on the cell identifier or a sequence group identifier.

15. The communication apparatus according to claim 11, wherein the first signal is a downlink demodulation reference signal (DMRS), a sounding reference signal (SRS), or control information.

16. A communication apparatus, comprising at least one processor and a transceiver, wherein the at least one processor is coupled to the transceiver;
    the transceiver is configured to receive a first signal carried on N subcarrier groups, and obtaining a sequence that is carried by the first signal and that is in an $i^{th}$ subcarrier group in the N subcarrier groups, wherein N is a positive integer greater than or equal to 1, the sequence is a first segment of a sequence $\{z_q(m)\}$; a length of the sequence $\{z_q(m)\}$ is M; the sequence meets $z_q(m)=y_q(m \bmod M_{zc})$, wherein m=0, 1, 2, ..., M−1, M is an integer greater than 1, $M_{zc}$ is a maximum prime number that is less than M or a minimum prime number that is larger than M; and $K_i < Mzc/2$, $y_q(t)=A \cdot \exp(j\alpha t)\exp$ $$K_i < \frac{Mzc}{2}, y_q(t) = A \cdot \exp(j\alpha t)\exp\left(-\frac{j\pi qt(t+1)}{M_{zc}}\right),$$

wherein A is a non-zero complex constant, t=0, 1, 2, ..., $M_{zc}-1$, $j=\sqrt{-1}$, α is a real number, q is determined based on an identifier of the first signal or a cell identifier, and $q=\lfloor \bar{q}+\frac{1}{2} \rfloor$, wherein $\bar{q}=M_{zc} \cdot (n_{id}+1)/p$, $n_{id} \in \{0, 1, 2, \ldots, p-2\}$, p is a prime number greater than 2, and $n_{id}$ is determined based on the identifier of the first signal or the cell identifier; and
    the at least one processor is configured to process the first signal.

17. The communication apparatus according to claim 16, wherein a part that is of the first signal and that is carried on the $k^{th}$ subcarrier in the $i^{th}$ subcarrier group in the N subcarrier groups is $x_{i,n_{id}}(k)$, wherein k=0, 1, 2, ..., $K_i-1$, $x_{i,n_{id}}(k)=z_q(d_i+k)$, and $d_i$ is a non-negative integer.

18. The communication apparatus according to claim 17, wherein a value of M is determined based on a maximum system bandwidth or a bandwidth part, and a value of $d_i$ is determined based on a position, in the system bandwidth or the bandwidth part, of a subcarrier in the $i^{th}$ subcarrier group in which the first signal is located.

19. The communication apparatus according to claim 17, wherein the N subcarrier groups belong to a subcarrier group set, the subcarrier group set further comprises F subcarrier groups, frequency domain positions of the F subcarrier groups are different from frequency domain positions of the N subcarrier groups, $n_{id}$ corresponding to the F subcarrier groups is the same as $n_{id}$ corresponding to the N subcarrier groups, and F is a positive integer.

20. The communication apparatus according to claim 17, wherein $$d_i = \left\lfloor \frac{n_i}{n_{dist}} \right\rfloor + n_{offset}, n_i$$

is a number of a smallest subcarrier in the $i^{th}$ subcarrier group, $n_{dist}$ is a spacing between subcarriers in the subcarrier group and is a positive integer, and $n_{offset}$ is an integer.

* * * * *

UNITED STATES PATENT AND TRADEMARK OFFICE
CERTIFICATE OF CORRECTION

PATENT NO. : 11,956,178 B2
APPLICATION NO. : 17/380097
DATED : April 9, 2024
INVENTOR(S) : Mingxin Gong It is certified that error appears in the above-identified patent and that said Letters Patent is hereby corrected as shown below:

In the Specification

Column 13, Line 36, change "'I'" to --"/"--.

Signed and Sealed this
Fifteenth Day of October, 2024

Katherine Kelly Vidal
*Director of the United States Patent and Trademark Office*